US012025926B2

(12) United States Patent
Miyahara et al.

(10) Patent No.: US 12,025,926 B2
(45) Date of Patent: Jul. 2, 2024

(54) ELECTROPHOTOGRAPHIC MEMBER AND HEAT FIXING DEVICE

(71) Applicant: CANON KABUSHIKI KAISHA, Tokyo (JP)

(72) Inventors: Yasuhiro Miyahara, Tokyo (JP); Shigeo Kuroda, Chiba (JP); Matsutaka Maeda, Kanagawa (JP); Yuji Kitano, Kanagawa (JP); Makoto Souma, Kanagawa (JP); Yutaro Yoshida, Kanagawa (JP)

(73) Assignee: CANON KABU SHIKI KAISHA, Tokyo (JP)

( * ) Notice: Subject to any disclaimer, the term of this patent is extended or adjusted under 35 U.S.C. 154(b) by 0 days.

(21) Appl. No.: 18/299,241

(22) Filed: Apr. 12, 2023

(65) Prior Publication Data

US 2023/0341800 A1 Oct. 26, 2023

(30) Foreign Application Priority Data

Apr. 19, 2022 (JP) ................................ 2022-068808
Apr. 7, 2023 (JP) ................................ 2023-062779

(51) Int. Cl.
*G03G 15/20* (2006.01)

(52) U.S. Cl.
CPC ....... *G03G 15/2057* (2013.01); *G03G 15/206* (2013.01); *G03G 15/2064* (2013.01); *G03G 2215/2051* (2013.01); *G03G 2215/2054* (2013.01)

(58) Field of Classification Search
None
See application file for complete search history.

(56) References Cited

U.S. PATENT DOCUMENTS 7,537,838 B2 5/2009 Hirabayashi et al.
10,620,574 B2 4/2020 Kitano et al.
10,712,697 B2 7/2020 Maeda et al.
(Continued)

FOREIGN PATENT DOCUMENTS

JP 8-27313 A 1/1996
JP 2007-171946 A 7/2007
(Continued)

OTHER PUBLICATIONS

Nobuyuki Otsu et al., "A Threshold Selection Method from Gray-Level Histograms," SMC-9(1) IEEE Transactions on Systems, Man, and Cybernetics 62-66 (Jan. 1979).

*Primary Examiner* — Sevan A Aydin
(74) *Attorney, Agent, or Firm* — VENABLE LLP

(57) ABSTRACT

An electrophotographic member having an endless shape comprises: a substrate; and an elastic layer on an outer peripheral surface thereof. The elastic layer contains a silicone rubber and metal silicon fillers dispersed in the silicone rubber. An average of area ratios of the metal silicon fillers in respective first binarized images is 42% or less, and an average of area ratios of the metal silicon fillers in respective second binarized images is 42% or less. The elastic layer has λ of 1.30 W/(m·K) or more, where λ is a thermal conductivity of the elastic layer in a thickness direction thereof, and the elastic layer has ρV of 9.0 LOG Ω·cm or more, where ρV is a common logarithm value of a volume resistivity thereof.

13 Claims, 7 Drawing Sheets

(56) References Cited

U.S. PATENT DOCUMENTS

| | | | | |
|---|---|---|---|---|
| 10,890,869 | B2 | 1/2021 | Miyahara et al. | |
| 11,467,520 | B2 | 10/2022 | Kitano et al. | |
| 11,573,515 | B2 | 2/2023 | Miyahara et al. | |
| 11,635,717 | B2 | 4/2023 | Maeda et al. | |
| 2005/0111892 | A1 * | 5/2005 | Mitsuoka | G03G 15/2064 399/328 |
| 2012/0014726 | A1 * | 1/2012 | Sekihara | G03G 15/206 399/333 |
| 2015/0071690 | A1 * | 3/2015 | Miyahara | G03G 15/206 399/333 |
| 2016/0122611 | A1 * | 5/2016 | Yoshida | G03G 15/2057 252/78.3 |
| 2019/0377290 | A1 * | 12/2019 | Kitano | G03G 15/2057 |
| 2019/0377291 | A1 * | 12/2019 | Maeda | G03G 15/2057 |
| 2022/0075296 | A1 * | 3/2022 | Kitano | G03G 15/2057 |
| 2022/0260945 | A1 * | 8/2022 | Maeda | G03G 15/2057 |
| 2023/0195015 | A1 | 6/2023 | Kitano et al. | |
| 2023/0205123 | A1 | 6/2023 | Kitano et al. | |

FOREIGN PATENT DOCUMENTS

| | | | |
|---|---|---|---|
| JP | 2016-188359 | A | 11/2016 |
| JP | 2019-215531 | A | 12/2019 |
| JP | 2020194156 | A | 12/2020 |

* cited by examiner

ELECTROPHOTOGRAPHIC MEMBER AND HEAT FIXING DEVICE

BACKGROUND

Technical Field

The present disclosure relates to an electrophotographic member and a heat fixing device to be used in an electrophotographic image forming apparatus, such as a copying machine or a printer.

In the heat fixing device of an electrophotographic image forming apparatus, a pressure contact portion includes a member for heating and fixation, and a pressurizing member arranged to face the member (sometimes referred to as "heating member" or "fixing member"). When a recording material holding an unfixed toner image is introduced into the pressure contact portion, unfixed toner is heated and pressurized, and the toner is melted to fix the image onto the recording material. The heating member is a member with which the unfixed toner image on the recording material is brought into contact, and the pressurizing member is a member arranged to face the heating member. The electrophotographic member is, for example, a rotatable electrophotographic member having a roller shape or an endless belt shape. An electrophotographic member including, on a substrate formed of a metal, a heat-resistant resin, or the like, an elastic layer containing a rubber such as a crosslinked silicone rubber, and heat conductive particles has been used as such electrophotographic member.

In recent years, an increase in print speed and the shortening of a rise-up time have been advancing more and more, and along with the advance, the elastic layer of the heating member has started to be required to achieve a further improvement in thermal conductivity in its thickness direction and a further reduction in heat capacity. In Japanese Patent Application Laid-Open No. 2007-171946, there are disclosures of a heat fixing roll and a fixing belt each using, as an elastic layer having a high thermal conductivity and a low heat capacity, a silicone rubber composition blended with metal silicon powder serving as heat conductive particles.

However, as the content of the metal silicon powder in the elastic layer is increased for further improving the thermal conductivity of the elastic layer, the hardness of the elastic layer rises and the durability of the elastic layer reduces. This is probably because as the content of the metal silicon powder is increased, the deformation of the rubber portion of the layer becomes larger, and hence a rubber is liable to be broken at an interface between the heat conductive particles and the rubber. In view of the foregoing, the inventors have disclosed, in Japanese Patent Application Laid-Open No. 2019-215531, a fixing member having a high thermal conductivity in its thickness direction and a low hardness.

SUMMARY

At least one aspect of the present disclosure is directed to providing an electrophotographic member, which has a high thermal conductivity in its thickness direction and can prevent the occurrence of an image defect resulting from peeling discharge. In addition, at least one aspect of the present disclosure is directed to providing a heat fixing device that can stably form a high-quality electrophotographic image.

According to at least one aspect of the present disclosure, there is provided an electrophotographic member having an endless shape comprising: a substrate; and an elastic layer on an outer peripheral surface of the substrate, the elastic layer containing a silicone rubber and metal silicon fillers dispersed in the silicone rubber, wherein an average of area ratios of the metal silicon fillers in respective first binarized images each having a size measuring 150 μm by 100 μm at 5 arbitrary sites of a first section in thickness-peripheral directions of the elastic layer is 42% or less, and an average of area ratios of the metal silicon fillers in respective second binarized images each having a size measuring 150 μm by 100 μm at 5 arbitrary sites of a second section in thickness-axial directions of the elastic layer is 42% or less, and wherein the elastic layer has $\lambda$ of 1.30 W/(m·K) or more, where $\lambda$ is a thermal conductivity of the elastic layer in a thickness direction thereof, and the elastic layer has $\rho V$ of 9.0 LOG Ω·cm or more, where $\rho V$ is a common logarithm value of a volume resistivity thereof.

In addition, according to at least one aspect of the present disclosure, there is provided a heat fixing device including: a heating member; and a pressurizing member arranged to face the heating member, wherein the heating member is the above-mentioned electrophotographic member.

Further features of the present disclosure will become apparent from the following description of exemplary embodiments with reference to the attached drawings.

DESCRIPTION OF THE EMBODIMENTS

Figure 1A:
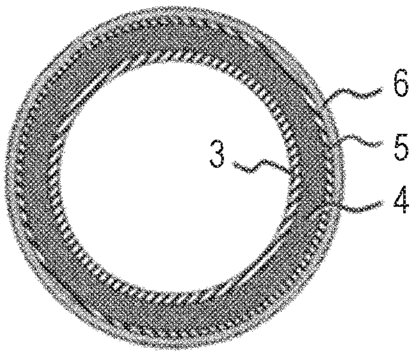
FIG. 1A and FIG. 1B are outline sectional views for illustrating the configurations of members for electrophotography according to two aspects of the present disclosure, FIG. 1A being an outline sectional view for illustrating an aspect of a fixing belt, and FIG. 1B being an outline sectional view for illustrating an aspect of a fixing roller.

Herein, the descriptions "XX or more and YY or less" and "from XX to YY" representing numerical ranges each mean a numerical range including a lower limit and an upper limit that are end points unless otherwise stated. In addition, when numerical ranges are described in a stepwise manner, the descriptions disclose that the upper limits and lower limits of the respective numerical ranges are arbitrarily combined.

The inventors have made a further investigation on the fixing member according to Japanese Patent Application Laid-Open No. 2019-215531, and as a result, have found a new problem with the fixing member. That is, the fixing member includes an elastic layer in which small-particle diameter metal silicon fillers each having a circle-equivalent diameter of less than 5 μm (hereinafter also referred to as "second fillers") are arrayed between large-particle diameter metal silicon fillers each having a circle-equivalent diameter of 5 μm or more (hereinafter also referred to as "first fillers") in its thickness direction. Thus, a high thermal conductivity in the thickness direction is expressed while the total amount of the fillers in the elastic layer is suppressed. However, the following tendency has been observed: a heat transfer path formed by the metal silicon fillers arrayed in the thickness direction also functions as a conductive path, and hence the volume resistivity of the elastic layer reduces. In addition, when such fixing member is used in the formation of an electrophotographic image under, for example, a low-temperature and low-humidity environment, an image defect resulting from peeling discharge has occurred in some cases. Although the reason why the fixing member according to Japanese Patent Application Laid-Open No. 2019-215531 in which the small-particle diameter fillers are arrayed may cause the image defect resulting from the peeling discharge under the low-temperature and low-humidity environment is unclear, the reason is assumed to be as described below. That is, the surface of the fixing member having a low volume resistivity is hardly charged even by friction in a fixing step. That is, the surface has low negativity. When peeling discharge occurs on such surface, the positivity of the portion of the surface where the peeling discharge has occurred becomes stronger than that of a fixing member having a high volume resistivity, and negatively charged toner may be more liable to be adsorbed by the portion to cause the defect.

To improve the volume resistivity of the elastic layer, the inventors have made an investigation on additional addition of insulating powder having a high volume resistivity except metal silicon, such as aluminum oxide, zinc oxide, or magnesium oxide. In some cases, however, the additional addition of such powder has increased the total amount of the fillers in the elastic layer to relatively reduce the flexibility and durability of the elastic layer, and the use of the metal silicon fillers has impaired the low volume specific heat property of the elastic layer.

In view of the foregoing, the inventors have made investigations for achieving the following: while the metal silicon fillers each having a low volume specific heat are arrayed in the thickness direction of the elastic layer to improve the thermal conductivity of the elastic layer in the thickness direction, a reduction in volume resistivity of the elastic layer is prevented. As a result, the inventors have found that the use of metal silicon fillers each having a "bound rubber" or an "oxide film" formed on its surface is conducive to the formation of the above-mentioned elastic layer.

An electrophotographic member according to one embodiment of the present disclosure is described in detail below based on a specific configuration at the time of its use as the fixing member of a heat fixing device.

An electrophotographic member according to at least one aspect of the present disclosure has an endless shape, and includes a substrate and an elastic layer arranged on an outer peripheral surface of the substrate.

The elastic layer contains a silicone rubber and metal silicon fillers dispersed in the silicone rubber, and an average of area ratios of the fillers in respective first binarized images each having a size measuring 150 μm by 100 μm at 5 arbitrary sites of a first section in thickness-peripheral directions of the elastic layer, and respective second binarized images each having a size measuring 150 μm by 100 μm at 5 arbitrary sites of a second section in thickness-axial directions of the elastic layer is 42% or less.

In addition, when a thermal conductivity of the elastic layer in a thickness direction thereof is represented by λ, and a volume resistivity thereof is represented by ρv, the λ is 1.30 W/(m·K) or more, and the ρv is 9.0 LOG Ω·m or more.

(1) Outline Configuration of Fixing Member

Details about a fixing member of this embodiment are described with reference to the drawings.

Figure 1B:
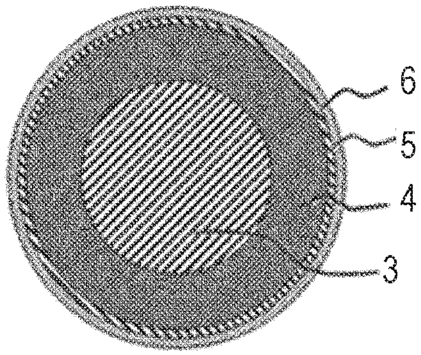

FIG. 1A and FIG. 1B are each an outline sectional schematic view for illustrating a fixing member having an endless shape according to this embodiment. Specifically, an example of a fixing member having an endless belt shape is illustrated in FIG. 1A. In addition, an example of a fixing member having a roller shape is illustrated in FIG. 1B. In each of FIG. 1A and FIG. 1B, a substrate is represented by reference numeral 3, and a silicone rubber-containing elastic layer covering the outer peripheral surface of the substrate 3 is represented by reference numeral 4. In each of FIG. 1A and FIG. 1B, a radial direction corresponds to the thickness direction of the elastic layer.

As described above, the fixing member according to this embodiment includes the substrate 3 and the silicone rubber-containing elastic layer 4 arranged on the substrate 3. As illustrated in each of FIG. 1A and FIG. 1B, the fixing member may include a surface layer 6 on the silicone rubber-containing elastic layer 4. In addition, the fixing member may include an adhesion layer 5 between the silicone rubber-containing elastic layer 4 and the surface layer 6, and in this case, the surface layer 6 is fixed to the outer peripheral surface of the silicone rubber-containing elastic layer 4 by the adhesion layer 5. The fixing members illustrated in FIG. 1A and FIG. 1B each have an endless shape. The term "endless shape" refers to such a shape that when the member shows rotational movement in its peripheral direction, the same site can pass through a fixing nip portion any number of times (endlessly).

(2) Substrate of Fixing Member

When the fixing member is such a belt form as illustrated in FIG. 1A, a metal, such as an electrocast nickel sleeve or a stainless-steel sleeve, or a heat-resistant resin such as polyimide may be used as the substrate 3. In particular, when the heat fixing device is an electromagnetic induction heating system, an alloy containing nickel or iron as a main component is used from the viewpoint of heat generation efficiency. A layer for imparting a function of improving an adhesive property with the elastic layer may be arranged on the outer surface (surface on the elastic layer side) of the substrate 3. That is, the elastic layer 4 only needs to be arranged on the outer peripheral surface of the substrate 3, and any other layer may be arranged between the elastic layer 4 and the substrate 3. In addition, a layer for imparting a function, such as wear resistance or lubricity, may be further arranged on the inner surface (surface opposite to the outer surface) of the substrate 3. When the fixing member is a belt form, the member is handled while a core is inserted into a sleeve during the following production process.

When the fixing member is such a roller form as illustrated in FIG. 1B, a mandrel formed of a metal, such as aluminum or iron, or an alloy containing the metal may be used as the substrate 3, and only needs to have such strength as to resist heating and pressurization in the heat fixing device. Although a solid mandrel is used as the substrate 3 in FIG. 1B, a hollow mandrel may be used as the substrate 3, and may include a heat source such as a halogen lamp therein.

(3) Elastic Layer

The elastic layer 4 is a layer for imparting flexibility to the fixing member for securing a fixing nip in the heat fixing device. When the fixing member is used as a heating member to be brought into contact with toner on paper, the elastic layer also functions as a layer for imparting such flexibility that the surface of the heating member may follow the irregularities of the paper.

The elastic layer satisfies the following requirements (i) and (ii).

Requirement (i)

An average of area ratios of the metal silicon fillers in respective first binarized images each having a size measuring 150 μm by 100 μm at 5 arbitrary sites of a first section in thickness-peripheral directions, and respective second binarized images each having a size measuring 150 μm by 100 μm at 5 arbitrary sites of a second section in thickness-axial directions is 42% or less.

Requirement (ii)

When a thermal conductivity in a thickness direction is represented by λ, and a common logarithm value of a volume resistivity is represented by ρv, the λ is 1.30 W/(m·K) or more, and the ρv is 9.0 LOG Ω·cm or more.

The elastic layer contains the silicone rubber serving as a matrix and the metal silicon fillers dispersed in the silicone rubber. Such elastic layer, for example, the elastic layer 4 may be a cured product of a liquid silicone rubber composition containing at least a liquid silicone rubber and the metal silicon fillers dispersed in the liquid silicone rubber.

When the elastic layer contains the metal silicon fillers, the thermal conductivity of the elastic layer can be improved while the low heat capacity thereof is maintained.

The matrix including the silicone rubber serves to express the elasticity of the elastic layer. The silicone rubber has such high heat resistance that its flexibility can be retained even in an environment having a temperature as high as a temperature of about 240° C. in a non-paper passing portion region. For example, a cured product of an addition-curable liquid silicone rubber to be described later may be used as the silicone rubber.

The addition-curable liquid silicone rubber composition includes at least the following components (a) to (d):

- component (a): an organopolysiloxane having an unsaturated aliphatic group;
- component (b): an organopolysiloxane having active hydrogen bonded to silicon;
- component (c): a catalyst; and
- component (d): metal silicon fillers.

The respective components are described below.

Component (a)

The organopolysiloxane having an unsaturated aliphatic group is an organopolysiloxane having an unsaturated aliphatic group such as a vinyl group, and examples thereof include organopolysiloxanes represented by the following structural formula (1) and structural formula (2).

(1)

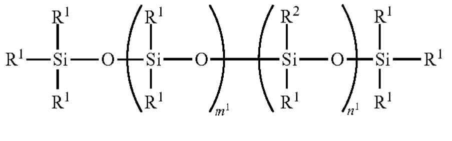

In the structural formula (1), $m^1$ represents an integer of 0 or more, and $n^1$ represents an integer of 3 or more. In addition, in the structural formula (1), R's each independently represent a monovalent unsubstituted or substituted hydrocarbon group free of any unsaturated aliphatic group, provided that at least one of $R^1$s represents a methyl group, and $R^2$s each independently represent an unsaturated aliphatic group.

(2)

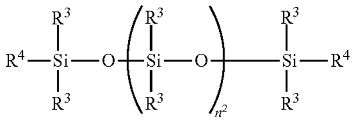

In the structural formula (2), $n^2$ represents a positive integer, $R^3$s each independently represent a monovalent unsubstituted or substituted hydrocarbon group free of any unsaturated aliphatic group, provided that at least one of $R^3$s represents a methyl group, and $R^4$s each independently represent an unsaturated aliphatic group.

In the structural formula (1) and the structural formula (2), examples of the monovalent unsubstituted or substituted hydrocarbon group free of any unsaturated aliphatic group that may be represented by any one of $R^1$s and $R^3$s may include the following groups.

Unsubstituted Hydrocarbon Group

Alkyl groups (e.g., a methyl group, an ethyl group, a propyl group, a butyl group, a pentyl group, and a hexyl group)

Aryl groups (e.g., a phenyl group)

Substituted Hydrocarbon Group

Substituted alkyl groups (e.g., a chloromethyl group, a 3-chloropropyl group, a 3,3,3-trifluoropropyl group, a 3-cyanopropyl group, and a 3-methoxypropyl group).

The organopolysiloxanes represented by the structural formula (1) and the structural formula (2) each have at least one methyl group directly bonded to a silicon atom forming a chain structure. However, 50% or more of each of $R^1$s and $R^3$s preferably represent methyl groups because such organopolysiloxane is easily synthesized and handled, and all of $R^1$s and $R^3$s more preferably represent methyl groups.

In addition, in the structural formula (1) and the structural formula (2), examples of the unsaturated aliphatic group that may be represented by any one of $R^2$s and $R^4$s may include the following groups. That is, examples of the unsaturated aliphatic group may include a vinyl group, an allyl group, a 3-butenyl group, a 4-pentenyl group, and a 5-hexenyl group. $R^2$s and $R^4$s each preferably represent a vinyl group out of those groups because such organopolysiloxane is easily synthesized and handled, and is available at low cost, and its crosslinking reaction is easily performed.

The viscosity of the component (a) is preferably 1,000 $mm^2/s$ to 50,000 $mm^2/s$ from the viewpoint of its moldability. When the viscosity is less than 1,000 $mm^2/s$, it becomes difficult to adjust the hardness of the elastic layer to a required one, and when the viscosity is more than 50,000 $mm^2/s$, the viscosity of the composition becomes so high that it becomes difficult to apply the composition. The viscosity (kinematic viscosity) may be measured based on JIS Z 8803:2011 with a capillary viscometer, a rotational viscometer, or the like.

The blending amount of the component (a) is preferably set to 55 vol % or more with respect to the liquid silicone rubber composition to be used in the formation of the elastic layer from the viewpoint of the durability of the layer, and is preferably set to 65 vol % or less with respect thereto from the viewpoint of the heat transfer property thereof.

Component (b)

The organopolysiloxane having active hydrogen bonded to silicon functions as a crosslinking agent that reacts with an unsaturated aliphatic group of the component (a) by virtue of the action of a catalyst to form a cured silicone rubber.

Any organopolysiloxane may be used as the component (b) as long as the organopolysiloxane has a Si—H bond. An organopolysiloxane having an average of 3 or more hydrogen atoms bonded to a silicon atom in a molecule thereof is particularly suitably used from the viewpoint of its reactivity with an unsaturated aliphatic group of the component (a).

Specific examples of the component (b) may include a linear organopolysiloxane represented by the following structural formula (3) and a cyclic organopolysiloxane represented by the following structural formula (4).

(3)

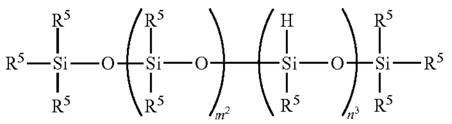

In the structural formula (3), $m^2$ represents an integer of 0 or more, $n^3$ represents an integer of 3 or more, and R's each independently represent a monovalent unsubstituted or substituted hydrocarbon group free of any unsaturated aliphatic group.

(4)

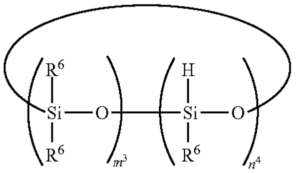

In the structural formula (4), $m^3$ represents an integer of 0 or more, $n^4$ represents an integer of 3 or more, and $R^6$s each independently represent a monovalent unsubstituted or substituted hydrocarbon group free of any unsaturated aliphatic group.

Examples of the monovalent unsubstituted or substituted hydrocarbon group free of any unsaturated aliphatic group that may be represented by any one of $R^5$s and $R^6$s in the structural formula (3) and the structural formula (4) may include the same groups as those represented by $R^1$s in the structural formula (1) described above. Fifty percent or more of each of $R^5$s and $R^6$s preferably represent methyl groups out of those groups because such organopolysiloxane is easily synthesized and handled, and excellent heat resistance is easily obtained, and all of $R^5$s and $R^6$s more preferably represent methyl groups.

Component (c)

The catalyst to be used in the formation of the silicone rubber may be, for example, a hydrosilylation catalyst for accelerating a curing reaction. A known substance, such as a platinum compound or a rhodium compound, may be used as the hydrosilylation catalyst. The blending amount of the catalyst may be appropriately set and is not particularly limited.

Component (d)

The metal silicon fillers may be produced by, for example, reducing silica stone, and pulverizing and classifying the resultant. The heat capacity of the metal silicon fillers per unit volume is about 1.7 $MJ/m^3 \cdot K$, and is smaller than the heat capacity of alumina, which has been frequently used for improving the thermophysical properties of a silicone rubber-containing elastic layer, per unit volume, that is, about 3.0 $MJ/m^3 \cdot K$. In addition, the thermal conductivity of metal silicon is as high as about 150 W/(m·K).

The particle diameter of the metal silicon fillers preferably falls within the range of from 1 μm to 20 μm in terms of volume-average particle diameter. When the particle diameter is 1 μm or more, the fillers are easily produced, and are easily loaded into silicone at a high density. When the particle diameter is 20 μm or less, the deterioration of image quality due to the irregularities of coarse particles at the time of the processing of the fillers into a fixing member can be suppressed. The particle diameter of the metal silicon fillers may be determined with, for example, a laser diffraction/scattering particle size distribution-measuring apparatus.

The volume blending ratio of all fillers in the elastic layer is preferably from 30 vol % to 50 vol %, particularly preferably from 35 vol % to 42 vol %. When the volume blending ratio of all the fillers in the elastic layer falls within the ranges, it becomes easier to adjust the tensile modulus of the elastic layer to 1.20 MPa or less. The tensile modulus of the elastic layer preferably falls within the range of from 0.20 MPa to 1.20 MPa.

A filler except the metal silicon fillers may be incorporated into the elastic layer according to the present disclosure to the extent that the incorporation does not deviate from the gist of the present disclosure. However, in order that the high thermal conductivity of the elastic layer in the thickness direction, the maintenance of the high flexibility of the elastic layer, and the high volume resistivity of the elastic layer may be satisfied at high levels, the ratio of the metal silicon fillers in all the fillers is set to preferably 90% or more, particularly preferably 95% or more, more preferably 100% on a mass basis. That is, it is particularly preferred that the metal silicon fillers be incorporated as the only fillers into the elastic layer.

As described above, the elastic layer according to one aspect of the present disclosure satisfies the requirements (i) and (ii). Herein, the requirement (i) specifies the content of the metal silicon fillers in the elastic layer. When the requirement is satisfied, the elastic layer can have high elasticity. Meanwhile, the content of the metal silicon fillers according to the specification of the requirement (i) makes it difficult to achieve the thermal conductivity of the elastic layer in the thickness direction according to the requirement (ii) (1.30 W/(m·K) or more). However, an increase in content of the metal silicon fillers causes a rise in elastic modulus (hardness) of the elastic layer. In view of the foregoing, a technology disclosed in Japanese Patent Application Laid-Open No. 2019-215531 is preferably used for improving the thermal conductivity of the elastic layer in the thickness direction without increasing the content of the metal silicon fillers. Metal silicon is a filler having a high thermal conductivity and a low volume specific heat, and has a high dielectric constant. Accordingly, the metal silicon has a high affinity for the technology described in Japanese Patent Application Laid-Open No. 2019-215531 in which while the array of the large-particle diameter fillers in the thickness direction of the elastic layer is suppressed, the small-particle diameter fillers are arrayed in the thickness direction of the elastic layer.

Specifically, the elastic layer according to one aspect of the present disclosure is preferably such that metal silicon fillers each having a circle-equivalent diameter of 5 μm or more (hereinafter also referred to as "first fillers"), and metal silicon fillers each having a circle-equivalent diameter of less than 5 μm (hereinafter also referred to as "second fillers") are observed in each of the first binarized images each having a size measuring 150 μm by 100 μm at the 5 arbitrary sites of the first section in the thickness-peripheral directions of the elastic layer, and the second binarized images each having a size measuring 150 μm by 100 μm at the 5 arbitrary sites of the second section in the thickness-axial directions of the elastic layer. That is, the metal silicon fillers to be incorporated into the elastic layer are preferably metal silicon fillers including the first fillers each having a circle-equivalent diameter of 5 μm or more, and the second fillers each having a circle-equivalent diameter of less than 5 μm. With regard to the first fillers, the average of the area ratios of the first fillers observed in each of the 5 first binarized images and the 5 second binarized images is preferably from 21% to 33%, particularly preferably from 22% to 32%. Herein, the area ratio of the first fillers refers to a value calculated from the expression [(total sum of areas of first fillers in binarized image×100)/(area of binarized image=150 μm×100 μm)]. When the average area ratio of the first fillers is 21% or more, in particular, 22% or more, a distance between the first fillers in a formation process for the elastic layer easily becomes such a distance that a sufficiently large local electric field can be generated between the first fillers at the time of the application of an electric field. As a result, the second fillers present between the first fillers can be arrayed more satisfactorily. In addition, when the average area ratio of the first fillers is 33% or less, in particular, 32% or less, it becomes easier to suppress a rise in elastic modulus of the elastic layer along with the incorporation of the metal silicon fillers.

With regard to the second fillers, the average of the area ratios of the second fillers observed in each of the 5 first binarized images and the 5 second binarized images is preferably from 7% to 21%, particularly preferably from 10% to 20%. Herein, the area ratio of the second fillers refers to a value calculated from the expression [(total sum of areas of second fillers in binarized image×100)/(area of binarized image=150 μm×100 μm)]. When the average area ratio of the second fillers is 7% or more, in particular, 10% or more, an improvement in thermal conductivity of the elastic layer in the thickness direction by the array of the second fillers between the first fillers can be more easily achieved. In addition, when the average area ratio of the second fillers is 21% or less, in particular, 20% or less, it becomes easier to suppress a rise in elastic modulus of the elastic layer along with the incorporation of the metal silicon fillers. In addition, a rise in viscosity of the liquid silicone rubber composition that may be used in the formation of the elastic layer can be more easily suppressed.

The sum of the average area ratio of the first fillers in the binarized images and the average area ratio of the second fillers in the binarized images is preferably set to 32% to 42%. The sum of the average area ratio of the first fillers and the average area ratio of the second fillers is a value closely related to the volume ratio of all the fillers in the elastic layer. When the sum of the average area ratio of the first fillers and the average area ratio of the second fillers is set within the range, both of an improvement in thermal conductivity of the elastic layer and the suppression of a rise in hardness thereof can be more satisfactorily achieved.

The contents of the cured silicone rubber and the metal silicon fillers in the elastic layer may be determined with a thermogravimetric apparatus (TGA) (e.g., a product available under the product name "TGA/DSC 3+" from Mettler-Toledo International Inc.). The elastic layer is cut out with a razor or the like, and about 20 mg thereof is precisely weighed and loaded into an alumina pan to be used in the apparatus. The alumina pan containing the sample is set in the apparatus, and under a nitrogen atmosphere, the sample is heated from room temperature to 800° C. at a rate of temperature increase of 20° C. per minute. Further, the temperature is kept constant at 800° C. for 1 hour. Comparison between the weights before and after such measurement can determine the content of the cured silicone rubber component in the elastic layer and the content of the metal silicon fillers therein.

The content of the metal silicon fillers may also be determined by subjecting a section of the elastic layer to energy dispersive X-ray analysis (EDS) (with, for example, a product available under the product name "X-MAX$^N$ 80" from Oxford Instruments). The content (vol %) of metal silicon on a volume basis may be calculated by calculating the ratio thereof from a density measured value when the elastic layer is cut into a piece measuring 30 mm by 30 mm by a thickness, the specific gravity of the metal silicon fillers, and the specific gravity of the silicone rubber free of the fillers.

The average array degree fL (hereinafter also simply referred to as "fL") of the first fillers in the thickness direction of the elastic layer is preferably 0.00 to 0.17, particularly preferably 0.00 to 0.15. A case in which the fL falls within the ranges means that the first fillers are weakly arrayed, or are not arrayed. Thus, a rise in elastic modulus of the elastic layer due to the array of the first fillers in the thickness direction of the elastic layer can be effectively suppressed.

The average array degree fS (hereinafter also simply referred to as "fS") of the second fillers in the thickness direction of the elastic layer is preferably 0.19 to 0.51, particularly preferably 0.20 to 0.50, more preferably 0.20 to 0.36. In addition, the average array angle ΦS (hereinafter also simply referred to as "ΦS") of the second fillers in the thickness direction of the elastic layer is preferably 59° to 120°, particularly preferably 60° to 120°, more preferably 60° to 103°. A case in which the fS and the ΦS fall within the ranges means that the second fillers are arrayed in the thickness direction of the elastic layer to a high degree. Thus, the thermal conductivity of the elastic layer in the thickness direction can be more easily improved.

Accordingly, when the fL, the fS, and the ΦS are set within the above-mentioned ranges, there can be more easily obtained an elastic layer, which has a high thermal conductivity in its thickness direction while being suppressed from rising in elastic modulus.

As described above, the fL is a parameter representing the degree to which the first fillers are arrayed in the elastic layer. In addition, the fS is a parameter representing the degree to which the second fillers are arrayed in the elastic layer, and the ΦS is a parameter representing the degree to which the second fillers are arrayed. Methods of calculating the fL, the fS, and the ΦS, and the technical significance of each of the parameters are described in detail below.

The fL, the fS, and the ΦS may be determined from elliptical plots obtained by subjecting the binarized images obtained from the sectional images of the elastic layer to two-dimensional Fourier transformation.

Figure 3A:
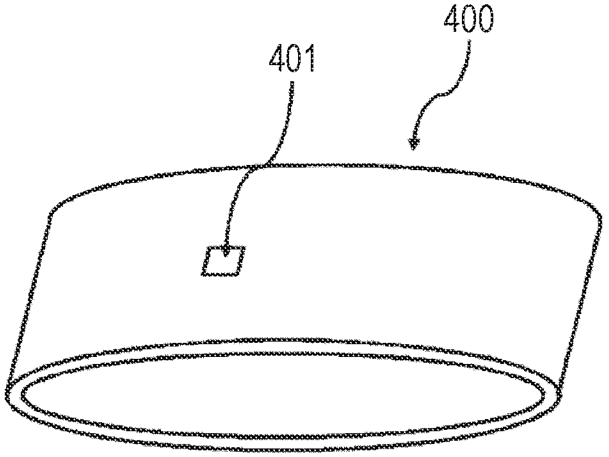
FIG. 3A and FIG. 3B are views for illustrating the first section and second section of the elastic layer of a belt-shaped electrophotographic member, respectively.
Figure 3B:
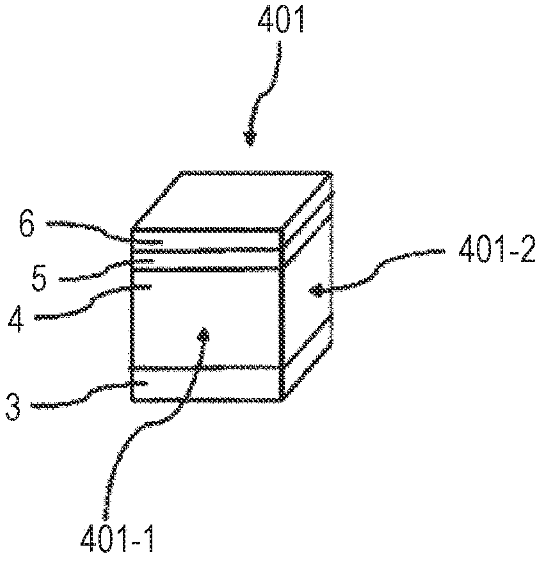

First, a measurement sample is produced. For example, when the fixing member is such a fixing belt 400 as illustrated in FIG. 3A, as illustrated in FIG. 3B, for example, 10 samples 401 each measuring 5 mm long by 5 mm wide and each having a thickness corresponding to the entire thickness of the fixing belt are collected from 10 arbitrary sites of the fixing belt. A section of each of 5 samples out of the 10 resultant samples in the peripheral direction of the fixing belt, that is, a section including a first section 401-1 in the thickness-peripheral directions of the elastic layer is subjected to polishing processing with an ion beam. In addition, a section of each of the remaining 5 samples in the direction perpendicular to the peripheral direction of the fixing belt, that is, a section including a second section 401-2 in the thickness-axial directions of the elastic layer is subjected to polishing processing with an ion beam. For example, a cross section polisher may be used in the polishing processing of a section with an ion beam. In the polishing processing of a section with an ion beam, the falling of the fillers from the sample and the inclusion of a polishing agent can be prevented, and a section having a small number of polishing marks can be formed.

Figure 4A:
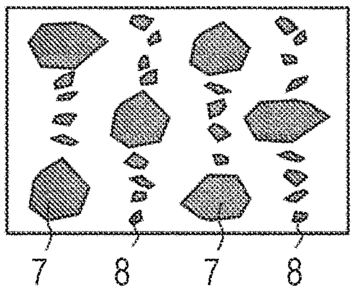
FIG. 4A, FIG. 4B, FIG. 4C, FIG. 4D, FIG. 4E, and FIG. 4F are schematic views for illustrating methods of determining the array degrees and array angles of fillers in an elastic layer.

Subsequently, for each of the 5 samples each having the first section subjected to the polishing processing, the first section is observed with a scanning electron microscope (SEM), and a sectional image (SEM image) of a region measuring 150 μm by 100 μm is obtained. In addition, for each of the 5 samples each having the second section subjected to the polishing processing, the second section is observed with the SEM, and a sectional image (SEM image) of a region measuring 150 μm by 100 μm is obtained. At this time, the following adjustment is performed: the vertical direction of each of the SEM images is parallel to the thickness direction of the elastic layer; and the horizontal direction of the SEM image is parallel to the peripheral direction or axial direction of the elastic layer. The resolution of each of the SEM images is set to a resolution sufficient for the analysis of the second fillers in the SEM image, for example, a resolution measuring 768 pixels long by 1,024 pixels wide. For example, a field emission scanning electron microscope (FE-SEM) may be used as the SEM. The FE-SEM is, for example, "SIGMA 500 VP" (product name, manufactured by Carl Zeiss AG). In addition, the observation may be performed in a backscattered electron image mode under the conditions of, for example, a magnification of 2,000, an acceleration voltage of 8.0 kV, and a working distance of 4 mm. An example of the SEM image (backscattered electron image) is shown in FIG. 4A.

Figure 4B:
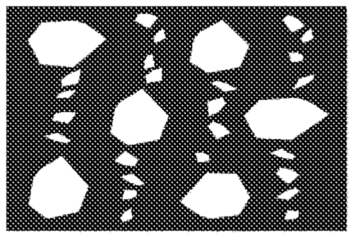

Next, each of the resultant SEM images is subjected to binarization processing so that a metal silicon filler portion may be white, and a silicone rubber portion may be black. A binarized image of the SEM image shown in FIG. 4A is shown in FIG. 4B. In FIG. 4B, a white portion is the metal silicon filler portion, and a black portion is the silicone rubber portion. In each of FIG. 4A and FIG. 4B, a horizontal direction is the peripheral direction or axial direction of the elastic layer, and a vertical direction is the thickness direction of the elastic layer. For example, Otsu's method described in a literature (IEEE Transactions on SYSTEMS, MAN, AND CYBERNETICS, vol. SMC-9, No. 1, January 1979, pp. 62-66) may be used in such binarization processing for obtaining a binarized image. In addition, for example, commercial image processing software "ImageJ" (product name, manufactured by the National Institutes of Health) may be used in such binarization processing.

Figure 4C:
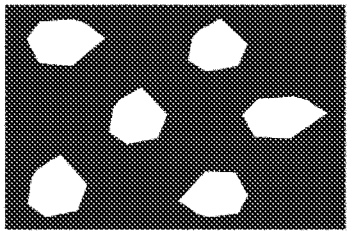

Next, the circle-equivalent diameters of the respective fillers 7 and 8 of the resultant binarized images are calculated, and each of the images is divided into an image in which only the first fillers 7 each having a circle-equivalent diameter of 5 μm or more are left (hereinafter also referred to as "first filler image," FIG. 4C), and an image in which only the second fillers 8 each having a circle-equivalent diameter of less than 5 μm are left (hereinafter also referred to as "second filler image," FIG. 4D). The area ratios of the first fillers 7 and the second fillers 8 (the ratios are each the ratio of the gross area of the first fillers 7 or the second fillers 8 to the total area of the corresponding image) are calculated from the first filler image and the second filler image thus obtained, respectively. The circle-equivalent diameters of the fillers refer to the diameters of circles having the same areas as the areas of the fillers.

Next, the first filler image and the second filler image are subjected to two-dimensional Fourier transformation, and the resultant power spectra are integrated in the thickness direction of the elastic layer to provide elliptical plots representing the directions in, and the degrees to, which the first fillers and the second fillers are arrayed in the elastic layer. An elliptical plot of the first fillers is shown in FIG. 4E, and an elliptical plot of the second fillers is shown in FIG. 4F. In the two-dimensional Fourier transformation, a peak appears in a direction perpendicular to the periodicity of a binarized image. In view of the foregoing, in each of the elliptical plots shown in FIG. 4E and FIG. 4F, the result of the two-dimensional Fourier transformation is represented so as to be out of phase by 90°. Accordingly, a 90°-270° direction in each of the elliptical plots shown in FIG. 4E and FIG. 4F represents the thickness direction of the elastic layer, and a 0°-180° direction therein represents the peripheral direction or axial direction of the elastic layer. In addition, an angle Φ (array angle) formed by the semi-major axis "x" of each of the elliptical plots shown in FIG. 4E and FIG. 4F with respect to the 0°-180° direction (abscissa axis direction) serves as a parameter representing the direction in which the first fillers and the second fillers are each arrayed in the thickness direction of the elastic layer. That is, a case in which the array angle Φ approaches 90° means that the fillers are arrayed in the thickness direction to a higher degree.

In addition, when, in each of the elliptical plots, the length of the semi-major axis "x" is represented by x1, and the length of a semi-minor axis "y" is represented by y1, the ellipticity of the elliptical plot determined from the following calculation equation (1) is adopted as an array degree "f".

$$f=1-(y1/x1) \quad (1)$$

The array degree "f" represents a value of 0 or more and less than 1. When the "f" represents 0, such elliptical plot becomes a circle, and represents a completely random state in which the fillers are not arrayed. In addition, as the "f" approaches 1, the ellipticity of the ellipse increases, and the increase means that the degree to which the fillers are arrayed in a certain direction in the elastic layer becomes larger.

The fL, the fS, and the ΦS in the present disclosure are the averages of the values of the array degrees and the array angles determined from the binarized images each having a size measuring 150 μm by 100 μm at the respective arbitrary positions of the first section in the thickness-peripheral directions of the elastic layer, and the second section in the thickness-axial directions thereof.

When the thermal conductivity of the elastic layer in the thickness direction is represented by λ, the λ is 1.30 W/(m·K) or more.

When the λ is set to 1.30 W/(m·K) or more, satisfactory fixation can be performed. Further, when the λ is 1.50 W/(m·K) or more, more satisfactory fixation can be performed.

The thermal conductivity λ of the elastic layer in its thickness direction may be calculated from the following equation:

$$\lambda=\alpha\times C_p\times\rho$$

where λ represents the thermal conductivity of the elastic layer in the thickness direction (W/(m·K)), α represents a thermal diffusivity in the thickness direction ($m^2/s$), $C_p$ represents a specific heat at constant pressure (J/(kg·K)), and ρ represents a density ($kg/m^3$). Methods of measuring the respective parameters are described in detail in Examples.

When the volume resistivity of the elastic layer is represented by ρv, the ρv is 9.0 LOG Ω·cm or more. When the ρv is 9.0 LOG Ω·cm or more, a peeling discharge mark can be suppressed. When the ρv is 10.0 LOG Ω·cm or more, the peeling discharge mark can be further suppressed.

The volume resistivity ρv of the elastic layer may be measured with a resistivity meter. A specific measurement method is described in detail in Examples.

In the elastic layer according to the present disclosure, the volume resistivity ρv is set within a high range of 9.0 LOG Ω·cm or more for suppressing a peeling discharge mark.

As described above, the array of the second fillers in the thickness direction of the elastic layer is effective in improving the thermal conductivity thereof in the thickness direction while suppressing the content of the metal silicon fillers in the elastic layer. However, the array of the second fillers in the thickness direction of the elastic layer may reduce the volume resistivity of the elastic layer. In view of the foregoing, one method by which, even when the second fillers are arrayed in the thickness direction of the elastic layer, a rise in volume resistivity of the elastic layer is suppressed, and hence the ρv thereof can be set to 9.0 Log Ω·cm or more is, for example, a method including using metal silicon fillers each having a bound rubber or an oxide film on its surface. Metal silicon fillers each of which is free of a bound rubber or an oxide film on its surface are hereinafter sometimes referred to as "untreated metal silicon fillers" for convenience.

The use of the metal silicon fillers each having the bound rubber or the oxide film on its surface can improve the thermal conductivity of the elastic layer in the thickness direction while suppressing a reduction in volume resistivity of the elastic layer. A possible reason for the foregoing is as follows: hydroxy groups and adsorbed water present in trace amounts on the surfaces of the untreated metal silicon fillers accelerate charge transfer; in contrast, in the metal silicon fillers each having the bound rubber or the oxide film on its surface, the bound rubber or the oxide film functions as an insulating layer.

Although surface treatment with a silane coupling agent or the like has been known as a method of treating the surface of a heat conductive filler, metal silicon powder has a small number of surface functional groups, and hence it is difficult to treat its surface.

The bound rubber is a phenomenon known mainly in the tire industry, which occurs in a rubber composition blended with carbon black. Specifically, the following rubber is referred to as "bound rubber" (Japanese Patent Application Laid-Open No. H08-27313): when the rubber is extracted from an unvulcanized rubber composition containing a filler such as carbon black with a solvent in which the unvulcanized rubber composition is soluble, the rubber is bonded to the filler, and is hence not eluted.

The inventors have measured the following amount as a bound rubber amount through thermogravimetric analysis for the metal silicon fillers extracted from the elastic layer according to the present disclosure: the amount of the silicone rubber remaining bonded to the metal silicon fillers. As a result, the inventors have found that as the bound rubber amount increases, the volume resistivity of the elastic layer becomes higher.

In addition, the "oxide film" in the present disclosure refers not to a silicon oxide film having a thickness of about 1 nm, which occurs as a natural oxide film on the surface of each of the metal silicon fillers, but refers to a silicon oxide film having a thickness of 3 nm or more, that is formed by forcibly accelerating the oxidation of the fillers. When the oxide film is allowed to have a sufficient thickness, the function of the oxide film portion as an insulating layer can be exhibited to set the common logarithm value (ρv) of the volume resistivity of the elastic layer to 9.0 LOG Ω·m or more. Detailed description is given below.

(d-1) Method of Forming Bound Rubber on Metal Silicon Fillers

Examples of a method of forming the bound rubber on the metal silicon powder include the following methods:

(i) a method including mixing the organopolysiloxane and the metal silicon fillers, and then leaving the mixture to stand still for a long time period; and (ii) a method including mixing the organopolysiloxane and the metal silicon fillers under the conditions of a low shear and a long time period.

Details about the methods are described below.

(i) Method Including Mixing Organopolysiloxane and Metal Silicon Fillers, and then Leaving Mixture to Stand Still for Long Time Period When a liquid silicone rubber composition obtained by mixing the organopolysiloxane and the metal silicon fillers is left to stand still, its bound rubber amount increases with time. When the composition is left to stand still for 30 days or more, the bound rubber is sufficiently formed to improve the strength of the composition after its curing. A device, such as a planetary mixer, a rotation-revolution mixer, or a kneader, is used as a mixing method. A temperature at the time of the mixing may be normal temperature (25° C.), or may be a high temperature of from 100° C. to 200° C. In addition, the temperature at the time of the still standing may be normal temperature, or may be set to high temperature. When the mixing is performed at high temperature, the following may be performed: the component (a) and the component (d) are mixed in advance to prepare a base compound, and then any other component is mixed into the compound.

A bound rubber formed from a rubber used in the tire industry is typically formed in from several hours to several days. In contrast, as described above, the formation of the bound rubber in the composition according to the present disclosure requires a long time period. A possible reason for the foregoing is as described below. Carbon black, which is a filler to be blended into the rubber used in the tire industry, has a particle diameter as small as several tens of nanometers, easily forms a secondary structure, and has an extremely large surface area. Accordingly, the bound rubber is formed on the carbon black in a relatively short time period. However, the metal silicon fillers according to the present disclosure each have a larger particle diameter and a smaller surface area than those of the carbon black. Accordingly, the formation of a sufficient amount of the bound rubber on the metal silicon fillers requires a longer time period.

(ii) Method Including Mixing Organopolysiloxane and Metal Silicon Fillers Under Conditions of Low Shear and Long Time Period A planetary mixer is often used as a device for mixing the organopolysiloxane and the metal silicon fillers. The term "planetary mixer" as used herein refers to the following device: the device has one or a plurality of stirring blades, and the stirring blades each rotate and revolve to mix the materials.

Typically, when the contents of the liquid silicone rubber composition are mixed with the planetary mixer, the revolution speed of the mixer is set to from 40 rpm to 200 rpm, the rotation speed thereof is set to be about twice as high as the revolution speed, and a mixing time is set to from about 5 minutes to about 40 minutes in many cases. In contrast, according to an investigation made by the inventors, the revolution speed is preferably set to a speed as extremely low as 10 rpm. In addition, the mixing time is preferably set to from 100 minutes to 300 minutes. A uniform liquid silicone rubber composition is thus prepared, and is then preferably left to stand still for about 5 days. Through such step, a sufficient amount of the bound rubber is formed on the metal silicon fillers, and hence the strength of a cured rubber becomes higher. Although the reason for the foregoing is unclear, it is expected that a silicone polymer permeates fine gaps and defects in the surfaces of the metal silicon fillers by virtue of capillary action or the like to form a sufficient amount of the bound rubber. As a shear rate becomes faster, it is conceivable that the wetting of the silicone polymer into the surfaces of the metal silicon fillers is not accelerated, and hence the capillary action is suppressed to reduce the amount of the bound rubber.

The bound rubber amount may be specified by a mass reduction rate which is determined by (i) collecting 2 g of a sample from the elastic layer; (ii) immersing the sample into 50 ml of a normal propyl bromide liquid containing dodecylbenzene sulfuric acid at a concentration of 10 wt % and having a temperature of 40° C., and applying an ultrasonic wave of 40 kHz for 60 minutes to solve the silicone rubber of the sample; (iii) extracting the metallic silicon particles, and then subjecting the metallic silicon particles extracted to vacuum filtration washing three times with 10 ml of toluene at a temperature of 25° C.; and (iv) subjecting the metallic silicon particles resulting from the step (iii) to a thermogravimetric analysis and measuring the mass reduction rate in temperature range of from 300° C. to 500° C.

In the present disclosure, the mass reduction rate in the range of from 300° C. to 500° C. in the thermogravimetric analysis of the resultant metal silicon fillers is preferably 0.05% or more.

When the mass reduction rate of the metal silicon fillers is 0.05% or more, in the liquid silicone rubber composition according to the present disclosure, a certain amount or more of the silicone rubber serving as a bound rubber may be bonded to the metal silicon fillers. As a result, the liquid silicone rubber composition according to the present disclosure can provide an elastic layer excellent in surface smoothness.

Here, a method of measuring the amount of the bound rubber bonded to the metal silicon fillers is more specifically described below.

The bound rubber amount of the metal silicon fillers in the elastic layer is measured with a thermogravimetric analyzer (TGA). 2 Grams of a sample is collected from the elastic layer, and is immersed in 50 ml of a normal propyl bromide liquid containing dodecylbenzenesulfuric acid at a concentration of 10 wt % (manufactured by Kaneko Chemical Co., Ltd.: e-SOLVE 21RS) at a temperature of 40° C., followed by the application of an ultrasonic wave at 40 kHz for 60 minutes. Thus, the cured silicone rubber is dissolved, and metal silicon fillers are extracted. Next, the metal silicon fillers are filtered under reduced pressure with 10 ml of toluene at 25° C. three times through use of a Kiriyama funnel having a diameter of 40 mm and filter paper No. 5C for a Kiriyama funnel (retained particle diameter: 1 μm) to provide metal silicon fillers. The silicone rubber that does not strongly adsorb to the metal silicon fillers is removed because the silicone rubber is soluble in toluene. The resultant metal silicon fillers are dried at 120° C. for 1 hour, and 50 mg thereof are weighed and subjected to TGA measurement. Specifically, the temperature of the fillers is increased from 50° C. to 500° C. at 5° C./min in a stream of dry air at 80 ml/min, and a change in mass thereof at the time was measured. A mass change in the range of from 300° C. to 500° C. is calculated from the resultant mass change data, and is adopted as a TGA loss ratio (%). The mass change in the temperature range of from 300° C. to 500° C. is adopted as the amount of the bound rubber strongly adsorbing to the metal silicon fillers because data on a mass change at less than 300° C. is affected by remaining moisture and toluene. In the temperature range of from 300° C. to 500° C., the metal silicon fillers alone show substantially no mass change, or are oxidized to some extent to show a mass increase. In contrast, the metal silicon fillers having strongly adsorbed thereto the silicone rubber are observed to show a mass loss because the silicone rubber starts to decompose at about 300° C. For example, a thermogravimetric analyzer/differential scanning calorimeter (product name: TGA/DSC 3+, manufactured by Mettler-Toledo International Inc.) may be used as an apparatus to be used in the TGA measurement.

(d-2) Method of Forming Oxide Film on Each of Metal Silicon Fillers

For example, the following method may be used as a method of forming the oxide film on each of the metal silicon fillers: the metal silicon fillers are dispersed in a high-speed airflow, and activated metal silicon filler surfaces and oxygen in the air are caused to react with each other through utilization of reaction heat generated at the time of the application of an impact force. The thickness of the oxide film may be adjusted by the number of revolutions of a rotor or a stator and a treatment time at the time of pulverization processing, and the concentration of an oxygen atmosphere to which the fillers are exposed. In addition, after the oxide film formation treatment, the particle diameter distribution of the fillers can be adjusted to a desired one through the classification thereof. The oxide film formation processing treatment may be performed with a hybridizer (e.g., a product available under the product name "HYBRIDIZATION SYSTEM HMS-1-2L" from Nara Machinery Co., Ltd.).

In addition, the thickness of the oxide film is measured by a FIB-TEM method, and the average of values measured at 5 sites is adopted as the thickness of the oxide film. Pretreatment conditions and measurement conditions are set as follows: coating is performed with E-1030 manufactured by Hitachi, Ltd. (Pt—Pd film, 15 mA, 60 seconds×twice); Helio 600 manufactured by FEI (μ-sampling, FIB: 30 kVGa+) is used as a FIB-SEM; and Tecnai F30 manufactured by FEI (300 kV) is used as a TEM.

The oxide film thus formed has a thickness of 3 nm or more. In addition, the upper limit of the thickness of the oxide film only needs to fall within such a range that a function as the metal silicon fillers is not impaired, and the thickness is preferably 20 nm or less.

(4) Adhesion Layer of Fixing Member

As illustrated in each of FIG. 1A and FIG. 1B, the adhesion layer 5 is a layer for bonding the elastic layer 4 and the surface layer (release layer) 6 to each other. An addition-curable silicone rubber blended with a self-adhesive component is preferably used as an adhesive. Specifically, the adhesive contains: an organopolysiloxane having a plurality of unsaturated aliphatic groups typified by a vinyl group in a molecular chain thereof; a hydrogen organopolysiloxane; and a platinum compound serving as a crosslinking catalyst. In addition, the adhesive is cured by an addition reaction. A known adhesive may be used as such adhesive.

Examples of the self-adhesive component include the following:

- a silane having at least one kind, preferably two or more kinds of functional groups selected from the group consisting of: an alkenyl group such as a vinyl group; a (meth)acryloxy group; a hydrosilyl group (SiH group); an epoxy group; an alkoxysilyl group; a carbonyl group; and a phenyl group;
- an organosilicon compound such as a cyclic or linear siloxane having 2 to 30, preferably 4 to 20 silicon atoms; and
- a non-silicon-based organic compound (that is, an organic compound free of any silicon atom in a molecule thereof) that may have an oxygen atom in a molecule thereof, provided that the compound contains 1 to 4, preferably 1 to 2 aromatic rings such as a monovalent or higher and tetravalent or lower, preferably divalent or higher and tetravalent or lower phenylene structure in a molecule thereof, and also contains at least 1, preferably 2 to 4 functional groups that may contribute to a hydrosilylation addition reaction (e.g., an alkenyl group or a (meth)acryloxy group) in a molecule thereof.

The above-mentioned self-adhesive components may be used alone or in combination thereof.

A filler component may be added to the adhesive from the viewpoints of the adjustment of its viscosity and the securement of its heat resistance to the extent that the addition does not deviate from the gist of present disclosure. Examples of the filler component include the following:

- silica, alumina, iron oxide, titanium oxide, cerium oxide, cerium hydroxide, and carbon black.

Such addition-curable silicone rubber adhesive is commercially available, and is hence easily available.

The thickness of the adhesion layer is preferably 20 μm or less. When the thickness is set to 20 μm or less, the heat resistance of the fixing member can be set to a small value, and hence heat from the inner surface side (substrate side) of the member can be efficiently transferred to a recording material (recording medium).

(5) Surface Layer of Fixing Member

When the electrophotographic member according to the present disclosure is used as the fixing member of a heat fixing device, a surface layer serving as a release layer is preferably arranged. A fluorine resin is preferably incorporated into the surface layer 6 for causing the layer to express a function as a release layer that prevents the adhesion of toner to the outer surface of the fixing member, and a tube method or a coating method is used as a molding method therefor. For example, a fixing member covered with any one of resins listed below, which has been molded into a tube shape, may be used:

- a tetrafluoroethylene-perfluoro(alkyl vinyl ether) copolymer (PFA), polytetrafluoroethylene (PTFE), a tetrafluoroethylene-hexafluoropropylene copolymer (FEP), and the like.

Of the resin materials listed above, PFA is preferred from the viewpoints of moldability and toner releasability.

The thickness of the fluorine resin layer (surface layer) is preferably set to 10 μm or more and 50 μm or less. When the thickness of the surface layer is set within the range, the elasticity of the elastic layer below the layer is maintained at the time of the lamination of the layer, and hence the wear resistance of the surface layer can be secured while the surface hardness of the fixing member is suppressed from becoming excessively high.

(6) Method of Producing Fixing Member

The electrophotographic member according to the present disclosure may be produced by, for example, a production method including the following steps:

- (e) a step of preparing the substrate;
- (f) a step of forming the elastic layer on the substrate through use of the liquid silicone rubber composition containing the silicone rubber and the metal silicon fillers;
- (g) a step of forming the adhesion layer on the elastic layer; and
- (h) a step of forming the surface layer on the elastic layer.

The step (f) may include the following steps:

- (f-1) a step of preparing the liquid silicone rubber composition containing the silicone rubber and the metal silicon fillers (step of preparing a composition for an elastic layer);
- (f-2) a step of forming a layer containing the liquid silicone rubber composition on the substrate (step of forming a composition layer);
- (f-3) a step of bringing the metal silicon fillers in the layer containing the liquid silicone rubber composition into a predetermined arrayed state (step of arraying the metal silicon fillers); and
- (f-4) a step of curing the composition layer in which the metal silicon fillers have been brought into the predetermined arrayed state to form the elastic layer (curing step).

The steps (f-2) to (f-4) may be performed sequentially, or may be performed in tandem. The respective steps are described in detail below.

(e) Step of Preparing Substrate

The above-mentioned substrate is prepared, and is fixed to a jig or the like that holds its shape as required.

The surface of the substrate on the side facing the elastic layer may be subjected to surface treatment for imparting a function such as an adhesive property with the elastic layer. Examples of the surface treatment include: physical treatments, such as a blasting treatment, a lapping treatment, and polishing; and chemical treatments, such as an oxidation treatment, a coupling agent treatment, and a primer treatment. In addition, the physical treatment and the chemical treatment may be used in combination.

In particular, an elastic layer containing a crosslinked silicone rubber is used, and hence the outer surface of the substrate is preferably treated with a primer for improving adhesiveness between the substrate and the elastic layer. For example, a primer in a paint state obtained by appropriately blending and dispersing an additive in an organic solvent may be used as the primer. Such primer is commercially available. Examples of the additive may include silane coupling agents, silicone polymers, hydrogenated methylsiloxane, alkoxysilanes, catalysts for accelerating a reaction, such as hydrolysis, condensation, or addition, and colorants such as iron oxide. The primer treatment is performed by: applying the primer to the outer surface of the substrate; and subjecting the resultant to drying and calcining processes.

The primer may be appropriately selected depending on, for example, the material for the substrate, the kind of the elastic layer, and a reaction form at the time of crosslinking. For example, when the material for forming the elastic layer contains a large amount of an unsaturated aliphatic group, a material containing a hydrosilyl group is preferably used as the primer in order that the adhesive property may be imparted by a reaction with the unsaturated aliphatic group. In addition, when the material for forming the elastic layer contains a large amount of a hydrosilyl group, in contrast, a material containing an unsaturated aliphatic group is preferably used as the primer. Any other material except the foregoing such as a material containing an alkoxy group may be appropriately selected as the primer depending on the kinds of the substrate and the elastic layer serving as adherends.

(f) Elastic Layer-Forming Step (f-1) Step of Preparing Liquid Silicone Rubber Composition The liquid silicone rubber composition for forming an elastic layer, the composition containing the metal silicon fillers and the silicone rubber, is prepared.

When a method including forming a bound rubber on the surfaces of the metal silicon fillers is adopted as a method of increasing the volume resistivity ρv of the elastic layer, the bound rubber is formed on the surfaces of the metal silicon fillers by the above-mentioned method (d-1) at the time of the preparation of the composition. When a method including forming an oxide film on each of the surfaces of the metal silicon fillers is adopted, metal silicon fillers having oxide films formed on their surfaces, the fillers being obtained by the above-mentioned method (d-2), are used as the metal silicon fillers.

(f-2) Method of Forming Layer of Liquid Silicone Rubber Composition

The liquid silicone rubber composition is applied onto the substrate by a method, such as a mold molding method, a blade coating method, a nozzle coating method, or a ring coating method, to form the layer of the liquid silicone rubber composition (hereinafter also referred to as "composition layer").

(f-3) Step of Arraying Metal Silicon Fillers (Second Fillers)

A method including using a corona charger is described as one embodiment in which the metal silicon fillers in the composition layer formed in the step (f-2) are arrayed in its thickness direction. Corona charging systems are classified into a scorotron system in which a grid electrode is present between a corona wire and a body to be charged, and a corotron system in which no grid electrode is present; the scorotron system is preferred from the viewpoint of the controllability of the surface potential of the body to be charged.

Figure 2A:
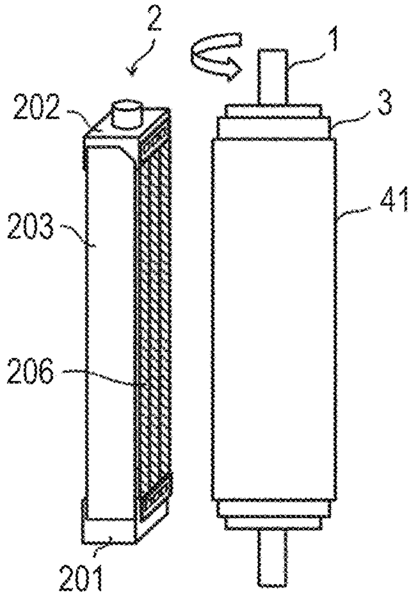
FIG. 2A and FIG. 2B are a bird's-eye view and a sectional view of a corona charger, respectively.
Figure 2B:
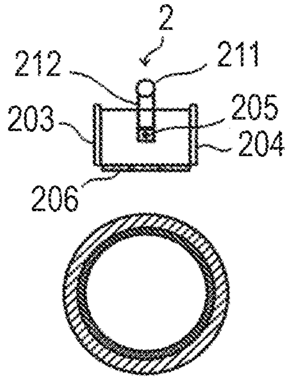

As illustrated in FIG. 2A and FIG. 2B, a corona charger 2 includes a front block 201, a rear block 202, and shields 203 and 204. In addition, a discharge wire 205 is tensioned between the front block 201 and the rear block 202. A high voltage is applied to the discharge wire 205 by a high-voltage power supply (not shown), and an ion current obtained by discharge to the shields 203 and 204 is controlled by applying a high voltage to grids 206. Thus, the surface of a composition layer 41 is charged.

At this time, the substrate 3 or a core 1 that holds the substrate 3 is grounded (not shown), and hence a desired electric field can be generated in the composition layer 41 by controlling the surface potential of the surface of the composition layer 41.

As illustrated in FIG. 2A, the corona charger 2 is arranged near a composition layer 41 to face the layer along the width direction of the layer. Then, under a state in which a voltage is applied to the grids 206 of the corona charger 2 to cause the grids to discharge, the substrate 3 having the composition layer 41 on its outer peripheral surface is rotated at, for example, 141 rpm for 160 seconds. Thus, the outer surface of the composition layer 41 is charged. A distance between the outer surface of the composition layer 41 and the grids 206 may be set to from 1 mm to 10 mm. The surface of the composition layer 41 is charged as described above to generate an electric field in the composition layer. As a result, the second fillers each having a circle-equivalent diameter of less than 5 μm can be arrayed in the thickness direction of the composition layer. Meanwhile, the positions of the first fillers each having a circle-equivalent diameter of 5 μm or more in the composition layer remain substantially unchanged, and polarization occurs in the first fillers to generate a local electric field between the first fillers. The second fillers positioned between the first fillers can be arrayed by such electric field.

The absolute value of the voltage to be applied to the grids 206 preferably falls within the range of from 0.1 kV to 3 kV (in the case of the application of an AC voltage, from 0.2 kV to 6 kV in terms of Vp-p) from the viewpoint of causing an effective electrostatic interaction between the metal silicon fillers. When the orientation of the metal silicon fillers in the thickness direction of the composition layer 41 is formed with an electric field, it is important that an electric field be generated in the thickness direction of the composition layer 41. When the sign of the voltage to be applied is set to be equal to the sign of the voltage to be applied to the wire, the same effect is obtained irrespective of whether the sign is negative or positive, though the direction of an electric field in the case of a negative sign is opposite to that in the case of a positive sign.

In addition, when the grids are charged with an AC voltage to suppress a liquid surface flow to be described later, the phases of the waveforms of the voltages to be applied to the wire and the grids are desirably caused to coincide with each other. Meanwhile, when the voltage to be applied to the grids 206 is excessively large, an electrostatic repulsive force caused by the surface charge of the elastic layer may become larger to cause a liquid surface flow, to thereby deteriorate the surface property of the composition layer 41. Accordingly, the absolute value of the voltage to be applied to the grids 206 more preferably falls within the range of from 0.1 kV to 1.5 kV (in the case of the application of an AC voltage, from 1.2 kV to 3 kV in terms of Vp-p). The liquid surface flow can be alleviated by charging the grids with an AC voltage.

As the configuration of potential control in the longitudinal direction of the surface of the composition layer 41, there may be used, for example, a configuration illustrated in FIG. 2A. When the voltage is applied to the grids 206 while the fixing belt 11 is rotated by using the central axis of the belt as a rotation axis during the application, the entirety of the composition layer 41 may be charged. The number of revolutions of the fixing belt is preferably set to from 10 rpm to 500 rpm, and a treatment time of 20 seconds or more is preferably provided as a treatment time for the charging from the viewpoint that the orientation of the metal silicon fillers is stably formed. As can be seen from the foregoing, the formation of the orientation of amorphous fillers can be controlled by controlling the surface potential of the layer and the time period for which an electric field is applied to the layer.

The corona charger can perform reciprocating vibration at an amplitude of from about +1 mm to about +10 mm and a frequency of from about 1 Hz to about 10 Hz in the longitudinal direction of the fixing member via a reciprocating mechanism to suppress abrupt changes in thermal conductivity, surface property, and hardness of the composition layer in a boundary portion between a region to which the electric field has been applied and a region to which no electric field has been applied.

Although stainless steel, nickel, molybdenum, tungsten, or the like may be used as the discharge wire 205, tungsten having extremely high stability among metals is preferably used. The discharge wire 205 to be tensioned inside the shields 203 and 204 is not particularly limited, and its shape may be a circular sectional shape or a shape like a saw tooth.

In addition, the diameter of the discharge wire 205 (in a cut surface when the wire is vertically cut) is preferably from 40 μm to 100 μm. When the diameter of the discharge wire is set within such range, the breakage of the discharge wire due to an ion at the time of its discharge can be prevented, and there is no need to excessively increase a voltage required to cause corona discharge. A DC voltage and an AC voltage may each be used as the voltage to be applied to the discharge wire 205. When the AC voltage is used, the voltage is preferably applied at a frequency of from about 0.01 Hz to about 1,000 Hz. The voltage can be applied by outputting a rectangular wave, a sine wave, or the like with an arbitrary waveform generator.

(f-4) Curing Step

The composition layer is cured by heating or the like to form the elastic layer in which the positions of the metal silicon fillers in the composition layer are fixed.

Figure 5:
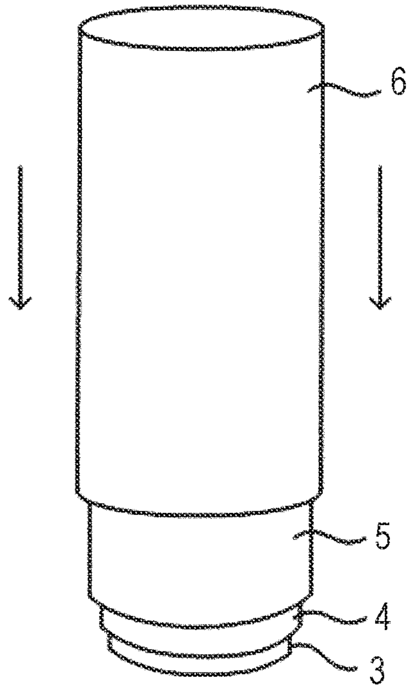
FIG. 5 is a schematic view of an example of a step of laminating a surface layer.

(g) Step of Forming Adhesion Layer on Elastic Layer (h) Step of Forming Surface Layer on Elastic Layer FIG. 5 is a schematic view for illustrating an example of a step of laminating the surface layer 6 on the silicone rubber-containing elastic layer 4 via the addition-curable silicone rubber adhesive. An addition-curable silicone rubber adhesive 5 is applied to the surface of the elastic layer 4 formed on the outer peripheral surface of the substrate 3. Further, the outer surface of the adhesive is covered with a fluorine resin tube 6 serving as the surface layer 6 so that the tube may be laminated thereon.

When the inner surface of the fluorine resin tube is subjected to sodium treatment, excimer laser treatment, ammonia treatment, or the like in advance, its adhesive property may be improved.

Although a method for the covering with the fluorine resin tube is not particularly limited, for example, a method including covering the outer surface through use of the addition-curable silicone rubber adhesive as a lubricant, or a method including expanding the fluorine resin tube from its outside to cover the outer surface may be employed.

In addition, the redundant addition-curable silicone rubber adhesive remaining between the elastic layer 4 and the surface layer 6 formed of the fluorine resin may be removed by being squeezed out with a unit (not shown). The thickness of the adhesion layer 5 after the squeezing is preferably set to 20 μm or less from the viewpoint of a heat transfer property.

Next, the addition-curable silicone rubber adhesive is heated with a heating unit such as an electric furnace for a predetermined time period to be cured and to bond the elastic layer and the surface layer, and both end portions thereof in the width direction are each cut into a desired length. Thus, the fixing member can be obtained.

(7) Identification of Arrayed State of Metal Silicon Fillers in Elastic Layer

The arrayed state of the metal silicon fillers may be identified by performing two-dimensional Fourier transformation through use of a binarized image obtained from a sectional image of the elastic layer.

First, a measurement sample is produced. For example, when the fixing member is such a fixing belt 400 as illustrated in FIG. 3A, as illustrated in FIG. 3B, for example, 10 samples 401 each measuring 5 mm long by 5 mm wide and each having a thickness corresponding to the entire thickness of the fixing belt are collected from 10 arbitrary sites of the fixing belt. A section of each of 5 samples out of the 10 resultant samples in the peripheral direction of the fixing belt, that is, a section including a first section 401-1 in the thickness-peripheral directions of the elastic layer is subjected to polishing processing with an ion beam. In addition, a section of each of the remaining 5 samples in the direction perpendicular to the peripheral direction of the fixing belt, that is, a section including a second section 401-2 in the thickness-axial directions of the elastic layer is subjected to polishing processing with an ion beam. For example, a cross section polisher may be used in the polishing processing of a section with an ion beam. In the polishing processing of a section with an ion beam, the falling of the fillers from the sample and the inclusion of a polishing agent can be prevented, and a section having a small number of polishing marks can be formed.

Subsequently, for the 5 samples in each of which the first section of the elastic layer has been subjected to the polishing processing, the first section of the elastic layer is observed with, for example, a laser microscope or a scanning electron microscope (SEM), and a sectional image of a region measuring 150 μm by 100 μm is obtained. Alternatively, for the 5 samples in each of which the second section of the elastic layer has been subjected to the polishing processing, the second section of the elastic layer is observed with, for example, a laser microscope or a scanning electron microscope (SEM), and a sectional image of a region measuring 150 μm by 100 μm is obtained (FIG. 4A).

Next, the resultant image is subjected to monochromatic binarization processing with commercial image software so that a filler portion may be white and a silicone rubber portion may be black (FIG. 4B). For example, Otsu's method may be used as an approach for the binarization.

Figure 4D:
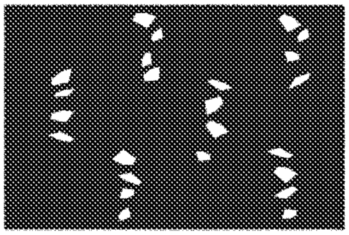
Figure 4E:
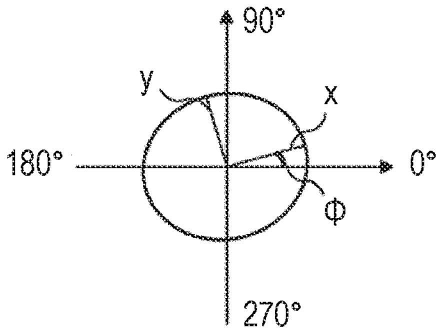
Figure 4F:
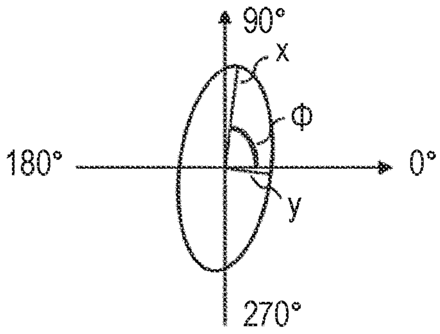

Next, the circle-equivalent diameters of the respective fillers 7 and 8 of the resultant binarized image are calculated, and the image is divided into an image in which only the first fillers 7 each having a circle-equivalent diameter of 5 μm or more are left (FIG. 4C) and an image in which only the second fillers 8 each having a circle-equivalent diameter of less than 5 μm are left (FIG. 4D). Then, the area ratio of the first fillers 7 or the second fillers 8 (the ratio of the total area of the fillers 7 or 8 to the gross area of each of the images) is calculated from each of the images. The circle-equivalent diameter of each of the fillers refers to the diameter of a circle having the same area as the area of the filler.

Further, when the first filler image and the second filler image are subjected to two-dimensional Fourier transformation analysis, elliptical plots each representing the direction and degree of filler array are obtained (FIG. 4E and FIG. 4F, respectively). The two-dimensional Fourier transformation itself has a peak in the direction perpendicular to the periodicity of each of the binarized images, and hence in each of the elliptical plots, a result obtained by shifting the phase of the result of the two-dimensional Fourier transformation by 90° is shown. An array angle Φ is determined from an angle formed by the semi-major axis of the ellipse of each of the elliptical plots, and a filler array degree "f" defined as $f=1-(y/x)$ when the semi-major axis and semi-minor axis of the ellipse are represented by "x" and "y", respectively is determined.

The array angle Φ represents the array direction of a filler, and in each of FIG. 4E and FIG. 4F, a 90°-270° direction represents the thickness direction of the elastic layer, and a 0°-180° direction represents the peripheral direction or axial direction of the elastic layer. Accordingly, a state in which the array angle Φ approaches 90° means that the filler is arrayed in the thickness direction to a higher degree.

In addition, the array degree "f" represents the ellipticity of the ellipse, and represents a value of 0 or more and less than 1. When the "f" represents 0, the ellipse becomes a circle, and hence the "f" represents a state in which the filler is not arrayed but is present in a completely random manner. As the "f" approaches 1, the ellipticity of the ellipse increases, and hence the array degree of the filler also increases.

The array angles Φ and array degrees "f" of fillers are measured at 5 sites in each of the first section in the thickness-peripheral directions of the elastic layer and the second section in the thickness-axial directions thereof, that is, a total of 10 sites, and the averages of the measured values are calculated.

In the present disclosure, the average area ratio of the first fillers each having a filler particle diameter (circle-equivalent diameter) of 5 μm or more is preferably 22% or more and 32% or less, i.e., from 22 to 32%. In the case that the average area ratio of the first fillers is 22% or more, it becomes more easier to position the first fillers so that the distances of each of the first fillers are suitable for generating a local electric field therebetween. As a result of that, the second fillers present between the first fillers can be more sufficiently arrayed, and hence it is possible to achieve high thermal conductivity in the thickness direction more effectively. Further, in the case that the average area ratio of the first fillers is 32% or less, it is possible to keep the hardness of the elastic layer low more easily. sufficiently reduce the hardness of the elastic layer.

When the average array degree of the first fillers is represented by fL, the fL is preferably 0.00 or more and 0.15 or less. When the fL is 0.15 or less, a reduction in hardness of the elastic layer can be achieved.

When the average array angle of the first fillers is represented by ΦL, the ΦL may represent any value of 0° or more and 180° or less.

The average area ratio of the second fillers each having a filler particle diameter of less than 5 μm is 10% or more and 20% or less. When the average area ratio of the second fillers is 10% or more, sufficiently high thermal conductivity can be achieved. In addition, when the average area ratio of the second fillers is 20% or less, a problem in terms of the processability or smoothness of the elastic layer resulting from an increase in viscosity of a material for the layer can be prevented from occurring.

When the average array degree of the second fillers is represented by fS, the fS is preferably 0.20 or more and 0.50 or less. When the fS falls within the range, the thermal conductivity of the elastic layer in its thickness direction can be improved.

When the average array angle of the second fillers is represented by ΦS, the ΦS in the longitudinal center region is 60° or more and 120° or less. The direction in which the ΦS becomes 90° is the thickness direction of the elastic layer. Accordingly, as the ΦS approaches 90°, the fillers are arrayed in the thickness direction to a higher degree. Accordingly, when the ΦS falls within the range, the thermal conductivity in the thickness direction can be improved. In addition, the ΦS at each of both the longitudinal end portions of the layer is 30° or less, or 150° or more. Herein, angles of 30° and 150° are identical in meaning in terms of heat transfer function in the thickness direction because the angles are in a mirror-image relationship with an angle of 90° as a border.

(6) Heat Fixing Device

A heat fixing device according to this embodiment includes a pair of heated rotating bodies like a roller and a roller, a belt and a roller, or a belt and a belt brought into pressure contact with each other. The kind of the heat fixing device is appropriately selected in consideration of conditions, such as a process speed and a size, as the entire image forming apparatus to which the heat fixing device is mounted.

In the heat fixing device, a fixing member and a pressurizing member each of which has been heated are brought into press contact with each other to form a fixing nip N, and a recording medium S serving as a body to be heated, the recording medium having formed thereon images with unfixed toners, is interposed and conveyed into the fixing nip N. The images formed with the unfixed toners are referred to as 'toner images "t".' Thus, the toner images "t" are heated and pressurized. As a result, the toner images "t" are melted and subjected to coloring mixing. After that, the toner images are cooled. Thus, an image is fixed onto the recording medium.

The configuration of the heat fixing device is described below by way of specific examples of the device, but the scope and applications of the present disclosure are not limited thereto.

(6-1) Heat Fixing Device of Fixing Belt-Pressurizing Belt System

Figure 6:
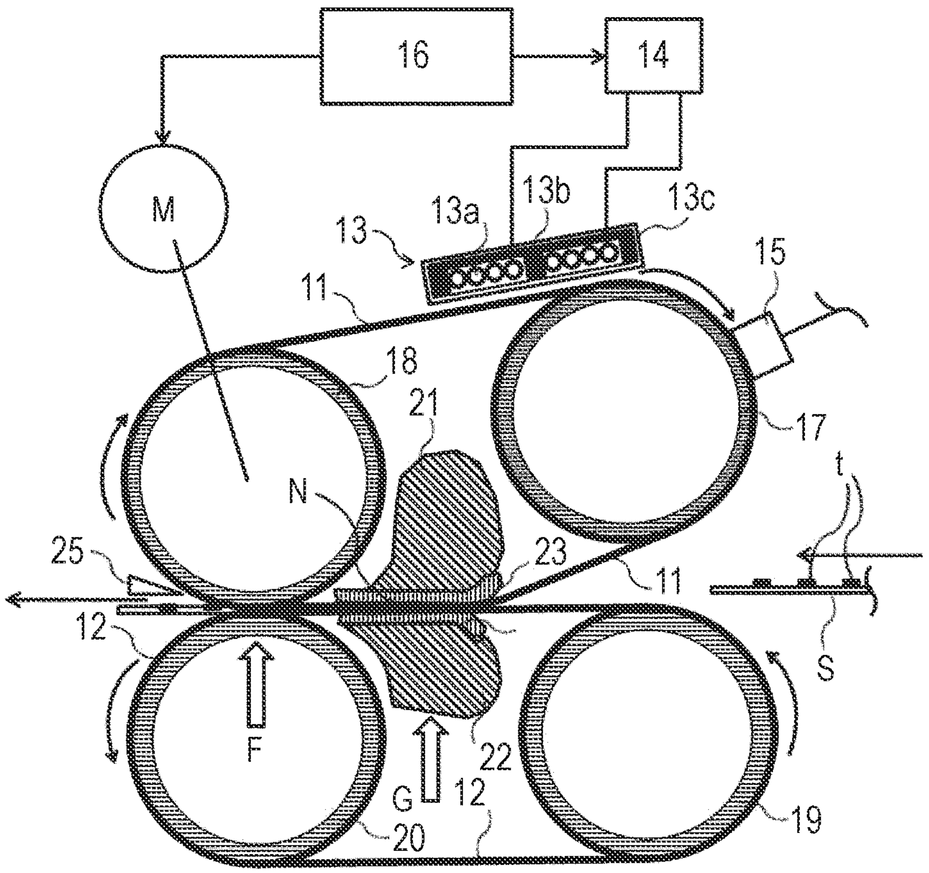
FIG. 6 is a sectional schematic view of an example of a heat fixing device of a fixing belt-pressurizing belt system.

FIG. 6 is a schematic sectional view of an example of a heat fixing device of a so-called twin-belt system in which a pair of rotating bodies like a fixing belt 11 and a pressurizing belt 12 is brought into press contact, the heat fixing device including the fixing belt as a fixing member.

Herein, the width direction of the heat fixing device or a member forming the device is the direction vertical to the drawing sheet of FIG. 6. The front surface of the heat fixing device is a surface on a side where the recording medium S is introduced.

The term "left" or "right" refers to the left or the right when the device is viewed from the front surface. The width of the belt is a belt dimension in a horizontal direction when the device is viewed from the front surface. The width of the recording medium S is the dimension of the recording medium in the direction perpendicular to its conveying direction. Further, the term "upstream" or "downstream" refers to upstream or downstream with respect to the direction in which the recording medium is conveyed.

The heat fixing device includes the fixing belt 11 serving as a fixing member and the pressurizing belt 12. The fixing belt 11 and the pressurizing belt 12 are each obtained by tensioning such a fixing belt as illustrated in FIG. 1A, the belt including a metal flexible substrate using nickel as a main component, between two rollers.

A heat source capable of heating by electromagnetic induction heating (an induction heating member or an exciting coil) having high energy efficiency is adopted as a unit for heating the fixing belt 11. An induction heating member 13 includes an induction coil 13*a*, an exciting core 13*b*, and a coil holder 13*c* that holds the coil and the core. The induction coil 13*a* uses a Litz wire flatly wound in an elliptical shape and is arranged in the horizontal E-shaped exciting core 13*b* protruding toward the center and both sides of the induction coil. A material having a high magnetic permeability and a low residual magnetic flux density, such as a ferrite or a permalloy, is used as a material for the exciting core 13*b*, and hence a loss in the induction coil 13*a* or the exciting core 13*b* can be suppressed and the fixing belt 11 can be efficiently heated.

When a high-frequency current is flowed from an exciting circuit 14 to the induction coil 13*a* of the induction heating member 13, the substrate of the fixing belt 11 causes induction heat generation and hence the fixing belt 11 is heated from a substrate side. The temperature of the surface of the fixing belt 11 is detected by a temperature detector element 15 such as a thermistor. A signal concerning the temperature of the fixing belt 11 detected by the temperature detector element 15 is sent to a control circuit portion 16. The control circuit portion 16 controls electric power supplied from the exciting circuit 14 to the induction coil 13*a* so that temperature information received from the temperature detector element 15 may be maintained at a predetermined fixation temperature, to thereby adjust the temperature of the fixing belt 11 to the predetermined fixation temperature.

The fixing belt 11 is tensioned by a roller 17 and a heating side roller 18 serving as belt rotating members. The roller 17 and the heating side roller 18 are rotatably supported with bearings between the left and right side plates (not shown) of the device.

The roller 17 is, for example, a hollow roller made of iron having an outer diameter of 20 mm, an inner diameter of 18 mm, and a thickness of 1 mm, and functions as a tension roller for providing the fixing belt 11 with tension. The heating side roller 18 is, for example, a highly slidable elastic roller obtained by providing a mandrel made of an iron alloy having an outer diameter of 20 mm and a diameter of 18 mm with a silicone rubber layer serving as an elastic layer.

A driving force is input from a driving source (motor) M into the heating side roller 18 as a drive roller through a drive gear train (not shown), and hence the roller is rotationally driven in a clockwise direction indicated by the arrow at a predetermined speed. When the heating side roller 18 is provided with the elastic layer as described above, the driving force input into the heating side roller 18 can be satisfactorily transferred to the fixing belt 11, and a fixing nip for securing the separability of the recording medium from the fixing belt 11 can be formed. When the heating side roller 18 includes the elastic layer, a shortening effect on a warm-up time is exhibited because the layer reduces the conduction of heat into the heating side roller.

When the heating side roller 18 is rotationally driven, the fixing belt 11 rotates together with the roller 17 by virtue of friction between the silicone rubber surface of the heating side roller 18 and the inner surface of the fixing belt 11. The arrangement and sizes of the roller 17 and the heating side roller 18 are selected in accordance with the size of the fixing belt 11. For example, the dimensions of the roller 17 and the heating side roller 18 are selected so that the fixing belt 11 having an inner diameter of 55 mm when not mounted on the rollers may be tensioned therebetween.

The pressurizing belt 12 is tensioned by a tension roller 19 and a pressurization side roller 20 serving as belt rotating members. The inner diameter of the pressurizing belt when not mounted on the rollers is, for example, 55 mm. The tension roller 19 and the pressurization side roller 20 are rotatably supported with bearings between the left and right side plates (not shown) of the device.

For example, the tension roller 19 is obtained by providing a mandrel made of an iron alloy having an outer diameter of 20 mm and a diameter of 16 mm with a silicone sponge layer for reducing a thermal conductivity to reduce the conduction of heat from the pressurizing belt 12.

The pressurization side roller 20 is, for example, a lowly slidable rigid roller made of an iron alloy having an outer diameter of 20 mm, an inner diameter of 16 mm, and a thickness of 2 mm. The dimensions of the tension roller 19 and the pressurization side roller 20 are similarly selected in accordance with the dimensions of the pressurizing belt 12.

Herein, in order that a fixing nip portion N may be formed between the fixing belt 11 and the pressurizing belt 12, both the left and right end sides of the rotation axis of the pressurization side roller 20 are pressurized toward the heating side roller 18 with a predetermined pressurizing force in a direction indicated by the arrow F by a pressurizing mechanism (not shown).

In addition, the following pressurizing pads are adopted for obtaining the wide fixing nip portion N without increasing the size of the device: a fixing pad 21 serving as a first pressurizing pad for pressurizing the fixing belt 11 toward the pressurizing belt 12; and a pressurizing pad 22 serving as a second pressurizing pad for pressurizing the pressurizing belt 12 toward the fixing belt 11. The fixing pad 21 and the pressurizing pad 22 are supported and arranged between the left and right side plates (not shown) of the device. The pressurizing pad 22 is pressurized toward the fixing pad 21 with a predetermined pressurizing force in a direction indicated by the arrow G by a pressurizing mechanism (not shown). The fixing pad 21 serving as the first pressurizing pad includes a pad substrate and a sliding sheet (low friction sheet) 23 in contact with the belt. The pressurizing pad 22 serving as the second pressurizing pad also includes a pad substrate and a sliding sheet 24 in contact with the belt. This is because there is a problem in that the shaving of a portion of the pad that rubs against the inner peripheral surface of the belt increases. When each of the sliding sheets 23 and 24 is interposed between the belt and the pad substrate, the shaving of the pad can be prevented and the sliding resistance of the belt can be reduced, and hence a good belt traveling property and good belt durability can be secured.

The fixing belt is provided with a non-contact antistatic brush (not shown) and the pressurizing belt is provided with a contact antistatic brush (not shown).

The control circuit portion 16 drives a motor M at least at the time of the performance of image formation. Thus, the heating side roller 18 is rotationally driven and the fixing belt 11 is rotationally driven in the same direction. The pressurizing belt 12 rotates following the fixing belt 11. In this case, the most downstream portion of the fixing nip has such a configuration that the recording medium is conveyed while the fixing belt 11 and the pressurizing belt 12 are sandwiched between a pair of the rollers 18 and 20, and hence the belts can be prevented from slipping. The most downstream portion of the fixing nip is a portion in which a pressure distribution in the fixing nip (in the direction in which the recording medium is conveyed) becomes maximum.

Under a state in which the temperature of the fixing belt 11 is increased to the predetermined fixation temperature and maintained (that is, the temperature is controlled), the recording medium S having the unfixed toner images “t” is conveyed into the fixing nip portion N between the fixing belt 11 and the pressurizing belt 12. The recording medium S is introduced with its surface bearing the unfixed toner images “t” directed toward the fixing belt 11. Then, the unfixed toner images “t” of the recording medium S are interposed and conveyed while closely adhering to the outer peripheral surface of the fixing belt 11. Thus, heat is applied from the fixing belt 11 to the images and the images receive a pressurizing force to be fixed onto the surface of the recording medium S. At this time, heat from the heated substrate of the fixing belt 11 is efficiently transported toward the recording medium S through the elastic layer improved in thermal conductivity in its thickness direction. After that, the recording medium S is separated from the fixing belt by a separating member 25 and conveyed.

(6-2) Heat Fixing Device of Fixing Belt-Pressurizing Roller System

Figure 7:
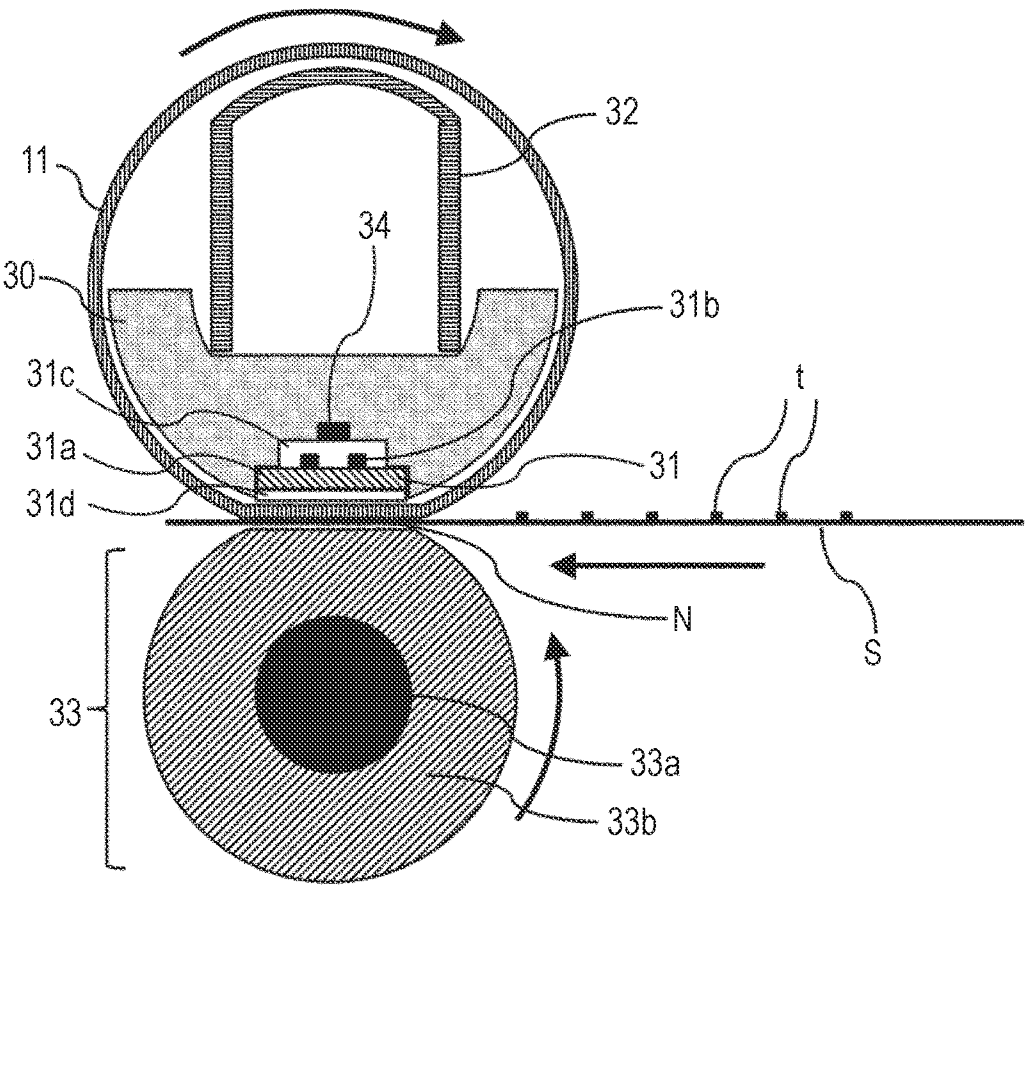
FIG. 7 is a sectional schematic view of an example of a heat fixing device of a fixing belt-pressurizing roller system.

FIG. 7 is a schematic view for illustrating an example of a heat fixing device of a fixing belt-pressurizing roller system using a ceramic heater as a heating body. In FIG. 7, a fixing belt having a cylindrical shape or an endless shape is represented by reference numeral 11, and such a fixing belt as described above is used as the belt. A heat-resistant and heat-insulating belt guide 30 for holding the fixing belt 11 is present, and at a position thereof in contact with the fixing belt 11 (substantially the central portion of the lower surface of the belt guide 30), a ceramic heater 31 that heats the fixing belt 11 is fixed and supported by being fitted into a groove portion formed and provided along the longitudinal direction of the guide. In addition, the fixing belt 11 is loosely fitted onto the belt guide 30. In addition, a rigid stay 32 for pressurization is inserted into the belt guide 30.

Meanwhile, a pressurizing roller 33 facing the fixing belt 11 is arranged. In this example, the pressurizing roller is an elastic pressurizing roller, that is, an elastic layer 33*b* of a silicone rubber is arranged on a mandrel 33*a* to reduce its hardness, and the roller is arranged by rotatably holding both end portions of the mandrel 33*a* with bearings between chassis side plates on the front side and rear side (not shown) of the device. The elastic pressurizing roller is covered with a tetrafluoroethylene-perfluoroalkyl ether copolymer (PFA) tube for improving its surface property.

A pressurizing spring (not shown) is contractedly arranged between each of both end portions of the rigid stay 32 for pressurization and a spring-receiving member (not shown) on a device chassis side to apply a depression force to the rigid stay 32 for pressurization. Thus, the lower surface of the ceramic heater 31 arranged on the lower surface of the belt guide member 30 made of a heat-resistant resin and the upper surface of the pressurizing roller 33 are brought into press contact with each other with the fixing belt 11 sandwiched therebetween to form the fixing nip portion N.

The pressurizing roller 33 is rotationally driven in a counterclockwise direction as indicated by the arrow by a driving unit (not shown).

A frictional force between the outer surfaces of the pressurizing roller 33 and the fixing belt 11 caused by the rotational driving of the pressurizing roller 33 applies a rotational force to the fixing belt 11. Through this action, the fixing belt 11 rotates outside the belt guide 30 in a clockwise direction as indicated by the arrow at a peripheral speed substantially corresponding to the rotational peripheral speed of the pressurizing roller 33 while its inner surface slides under a state of being in close contact with the lower surface of the ceramic heater 31 in the fixing nip portion N (pressurizing roller driving system).

The rotation of the pressurizing roller 33 is started and the heat-up of the ceramic heater 31 is started based on a print start signal. The peripheral speed of the rotation of the fixing belt 11 by the rotation of the pressurizing roller 33 is made steady, and the temperature of a temperature detector element 34 arranged on the upper surface of the ceramic heater rises up to a predetermined temperature, for example, 180° C. At that moment, the recording medium S bearing the unfixed toner images “t”, which serves as a material to be heated, is introduced between the fixing belt 11 and the pressurizing roller 33 in the fixing nip portion N with its toner image-bearing surface side directed toward the fixing belt 11. Then, the recording medium S is in close contact with the lower surface of the ceramic heater 31 in the fixing nip portion N via the fixing belt 11, and moves and passes through the fixing nip portion N together with the fixing belt 11. In the moving and passing process, the heat of the fixing belt 11 is applied to the recording medium S to heat the toner images “t” and to fix the images onto the surface of the recording medium S. The recording medium S that has passed through the fixing nip portion N is separated from the outer surface of the fixing belt 11 and conveyed.

The ceramic heater 31 serving as a heating body is a low-heat capacity and oblong linear heating body whose longitudinal direction is the direction perpendicular to the moving direction of the fixing belt 11 and the recording medium S. The basic configuration of the ceramic heater 31 is preferably as follows: the heater includes a heater substrate 31*a*, heat-generating layers 31*b* arranged on the surface of the heater substrate 31*a* along its longitudinal direction, a protective layer 31*c* arranged on the layers, and a sliding member 31*d*. In this case, the heater substrate 31*a* may include, for example, aluminum nitride. The heat-generating layers 31*b* may each be formed by applying an electrical resistance material such as a silver-palladium (Ag—Pd) alloy through screen printing or the like so that the material may have a thickness of about 10 μm and a width of from 1 mm to 5 mm. The ceramic heater to be used in the heat fixing device is not limited to such heater.

Then, when an electric current is flowed between both ends of each of the heat-generating layers 31*b* of the ceramic heater 31, the heat-generating layer 31*b* generates heat, and hence the temperature of the heater 31 rapidly increases.

The ceramic heater 31 is fixed and supported by being fitted into the groove portion formed and provided in substantially the central portion of the lower surface of the belt guide 30 along the longitudinal direction of the guide with its protective layer 31*c* side directed upward. In the fixing nip portion N in contact with the fixing belt 11, the surface of the sliding member 31*d* of the ceramic heater 31 and the inner surface of the fixing belt 11 slide while being in contact with each other.

As described above, the fixing belt 11 improves the thermal conductivity of the elastic layer containing the silicone rubber in its thickness direction, and suppresses the hardness of the layer to a low level. With such configuration, the fixing belt 11 can efficiently heat the unfixed toner images, and can fix a high-quality image to the recording medium S at the time of its passing through the fixing nip because of the low hardness.

As described above, according to one aspect of the present disclosure, there is provided the heat fixing device having arranged therein the electrophotographic member according to the present disclosure as a fixing member. Accordingly, the heat fixing device having arranged therein the fixing member excellent in fixing performance and image quality can be provided.

According to one aspect of the present disclosure, there is provided the electrophotographic member including an elastic layer, which satisfies thermal conductivity and a low volume specific heat required for an increase in print speed and the shortening of a rise-up time, and has a high volume resistivity effective in suppressing a peeling discharge mark. According to another aspect of the present disclosure, the heat fixing device that can form a high-quality electrophotographic image can be provided.

EXAMPLES

The present disclosure is described in more detail below by way of Examples.

Example 1

(1) Preparation of Liquid Addition-Curable Silicone Rubber Composition

First, 100 parts by mass of a silicone polymer, which had vinyl groups serving as unsaturated aliphatic groups only at both the terminals of a molecular chain thereof and further had a methyl group serving as an unsubstituted hydrocarbon group free of any other unsaturated aliphatic group, was prepared as the component (a). The silicone polymer (product name: DMS-V35, manufactured by Gelest Inc., viscosity: 5,000 $mm^2/s$) is hereinafter referred to as “Vi”.

Next, the following fillers were added as fillers serving as the component (d) to the Vi so that the total filler amount became 40 area %: 148 parts by mass of large-diameter metal silicon (product name: #350, manufactured by Kinsei Matec Co., Ltd., volume-average particle diameter: 10 μm) (hereinafter also referred to as “first fillers”) was added so that its amount became 30 area % with respect to the silicone component; and 17 parts by mass of small-diameter metal silicon (product name: FINE, manufactured by Kinsei Matec Co., Ltd., volume-average particle diameter: 3 μm) (hereinafter also described as “second fillers”) was added so that its amount became 10 area % with respect to the silicone component. The materials were set in a rotation-revolution mixer (product name: ARV-310, manufactured by Thinky Corporation), and were stirred and mixed at 2,000 rpm for 4 minutes to provide a mixture 1-1. After that, the mixture 1-1 was stored to stand still under normal temperature (25° C.) for 40 days.

Next, a solution obtained by dissolving 0.2 part by mass of 1-ethynyl-1-cyclohexanol (manufactured by Tokyo Chemical Industry Co., Ltd.) serving as a curing retarder in the same mass of toluene was added to the mixture 1-1. Thus, a mixture 1-2 was obtained.

Next, 0.1 part by mass of a hydrosilylation catalyst (platinum catalyst: a mixture of a 1,3-divinyltetramethyldisiloxane platinum complex, 1,3-divinyltetramethyldisiloxane, and 2-propanol) was added as the component (c) to the mixture 1-2. Thus, a mixture 1-3 was obtained.

Further, 1.5 parts by mass of a silicone polymer having a linear siloxane skeleton and having an active hydrogen group bonded to silicon only in a side chain thereof (product name: HMS-301, manufactured by Gelest, Inc., viscosity: 30 $mm^2/s$, hereinafter referred to as “SiH”) was weighed as the component (b). The polymer was added to the mixture 1-3, and the whole was sufficiently mixed to provide a liquid addition-curable silicone rubber composition for forming an elastic layer.

(2) Production of Fixing Belt

A SUS endless belt having an inner diameter of 55 mm, a width of 420 mm, and a thickness of 65 μm was prepared as a substrate. In a series of production steps, the endless belt was handled while a core was inserted into the belt.

A primer (product name: DY39-051A/B; manufactured by Dow Corning Toray Co., Ltd.) was applied to the outer peripheral surface of the substrate in a substantially uniform manner so that its dry weight became 20 mg. After the solvent had been dried, baking treatment was performed in an electric furnace set to 160° C. for 30 minutes.

The above-mentioned silicone rubber composition was applied onto the primer-treated substrate by a ring coating method to form a silicone rubber composition layer having a thickness of 250 μm. The layer is referred to as “uncured endless belt.”

Next, a corona charger having a charging region width of 295 mm was arranged to face the uncured endless belt along the generating line thereof, and while the uncured endless belt was rotated at 100 rpm, an AC electric field was applied to the surface of the elastic layer of the belt before its curing. The application was performed under the following conditions: a current to be supplied to the discharge wire of the corona charger was ±150 μA; the potential of a grid electrode was ±300 V (Vp-p: 600 V); a frequency was 0.025 Hz; a charging time was 100 seconds; and a distance between the grid electrode and the belt was 3 mm.

The uncured endless belt that had been charged was heated in an electric furnace at 160° C. for 1 minute (primary curing). After that, the belt was heated in an electric furnace at 200° C. for 30 minutes (secondary curing) so that the silicone rubber composition was cured. Thus, an endless belt including a cured elastic layer was obtained.

Next, an addition-curable silicone rubber adhesive (product name: SE1819CV A/B; manufactured by Dow Corning Toray Co., Ltd.) was applied as an adhesion layer to the surface of the elastic layer of the cured endless belt in a substantially uniform manner so as to have a thickness of about 20 μm. A fluorine resin tube having an inner diameter of 53 mm and a thickness of 40 μm (product name: NSE; manufactured by Gunze Limited) was laminated as a release layer on the resultant while its diameter was expanded. After that, the surface of the belt was uniformly squeezed from above the fluorine resin tube. Thus, the redundant adhesive was squeezed out of a space between the elastic layer and the fluorine resin tube so that the thickness of the adhesive became as small as about 5 μm.

The endless belt was heated in an electric furnace set to 200° C. for 1 hour. Thus, the adhesive was cured to fix the fluorine resin tube on the elastic layer. Both the end portions of the resultant endless belt were cut. Thus, a fixing belt having a width of 368 mm was obtained.

(3) Characteristic Evaluation of Elastic Layer of Fixing Belt (3-1) Thermal Conductivity of Elastic Layer in its Thickness Direction The thermal conductivity λ of the elastic layer in its thickness direction was calculated from the following equation:

$$\lambda=\alpha\times C_p\times\rho$$

where λ represents the thermal conductivity of the elastic layer in the thickness direction (W/(m·K)), α represents a thermal diffusivity in the thickness direction ($m^2/s$), $C_p$ represents a specific heat at constant pressure (J/(kg·K)), and ρ represents a density ($kg/m^3$).

Herein, the values of the thermal diffusivity α in the thickness direction, the specific heat at constant pressure $C_p$, and the density p were determined by the following methods.

Thermal Diffusivity α

The thermal diffusivity α of the elastic layer in the thickness direction was measured with a periodical heating method thermal diffusivity measurement system (product name: FTC-1, manufactured by Advance Riko, Inc.) at room temperature (25° C.). A sample piece having an area measuring 8 mm by 12 mm was cut out of the elastic layer with a cutter, and a total of 5 sample pieces were produced. The thicknesses of the respective sample pieces were measured with a digital length measuring system (product name: DIGIMICRO (trademark) MF-501, flat probe $4 mm; manufactured by Nikon Corporation). Next, the thermal diffusivity of each of the sample pieces was measured a total of 5 times, and the average ($m^2/s$) of the measured values was determined. The measurement was performed while the sample piece was pressurized with a weight of 1 kg.

As a result, the thermal diffusivity a of the silicone rubber elastic layer in the thickness direction was $9.33\times10^{-7}$ $m^2/s$.

Specific Heat at Constant Pressure $C_p$

The specific heat at constant pressure of the elastic layer was measured with a differential scanning calorimeter (product name: DSC823e, manufactured by Mettler-Toledo International Inc.).

Specifically, pans made of aluminum were used as a pan for a sample and a reference pan.

First, as blank measurement, under a state in which both the pans were empty, measurement was performed by the following program: a temperature in the calorimeter was kept constant at 15° C. for 10 minutes, was then increased to 215° C. at a rate of temperature increase of 10° C./min, and was kept constant at 215° C. for 10 minutes. Next, measurement was performed through use of 10 mg of synthetic sapphire whose specific heat at constant pressure was known as a reference substance by the same program. Next, the same amount of a measurement sample as that of the synthetic sapphire serving as the reference substance, that is, 10 mg thereof was cut out of the elastic layer. After that, the sample was set in the sample pan, and measurement was performed by the same program. Those measurement results were analyzed with specific heat analysis software attached to the differential scanning calorimeter, and the specific heat at constant pressure $C_p$ at 25° C. was calculated from the average of the 5 measurement results.

As a result, the specific heat at constant pressure of the silicone rubber elastic layer was 1.05 J/(g·K).

Density ρ

The density of the elastic layer was measured with a dry automatic densimeter (product name: ACCUPYC 1330-01, manufactured by Shimadzu Corporation). Specifically, a sample cell having a volume of 10 $cm^3$ was used, and a sample piece was cut out of the elastic layer so as to account for about 80% of the volume of the cell. The mass of the sample piece was measured, and then the sample piece was loaded into the sample cell. The sample cell was set in a measuring portion in the apparatus. Helium was used as a gas for measurement, and the cell was purged with the gas. After that, the volume of the sample piece was measured 10 times. The density of the elastic layer was calculated from the mass of the sample piece and the measured volume for each measurement, and the average of the calculated values was determined.

As a result, the density of the silicone rubber elastic layer was 1.53 $g/cm^3$.

As can be seen from the foregoing, the thermal conductivity λ of the elastic layer in the thickness direction was calculated from the specific heat at constant pressure $C_p$ (J/(kg·K)) and density ρ ($kg/m^3$) of the elastic layer each of which had been subjected to unit conversion, and the measured thermal diffusivity α ($m^2/s$). As a result, the thermal conductivity was 1.50 W/(m·K).

(3-2) Volume Resistivity of Elastic Layer

The volume resistivity of the elastic layer was measured with a resistivity meter (product name: HIRESTA-UP (MCP-HT450), manufactured by Mitsubishi Chemical Analytech Co., Ltd.). Specifically, a test piece was cut out of the elastic layer with a cutter, and the area of the test piece thus cut out was set to measure 50 mm by 50 mm. After that, the volume resistivity of the test piece was measured for 10 seconds by applying a DC voltage of 250 V thereto with an URS probe. The measurement is performed in an environment at 23° C.±3° C. and 50% RH±5% RH. The measurement was performed five times, and the average of the measured values was determined.

(3-3) Evaluations of Average Area Ratios of First and Second Fillers, and fL, fS, and ΦS Ten samples each measuring 5 mm long by 5 mm wide, and each having a thickness corresponding to the total thickness of the produced fixing belt were collected from 10 arbitrary sites of the fixing belt. A section of each of 5 samples out of the 10 resultant samples in the peripheral direction of the fixing belt, that is, a section including the first section 401-1 in the thickness-peripheral directions of the elastic layer was subjected to polishing processing with an ion beam. In addition, a section of each of the remaining 5 samples in the direction perpendicular to the peripheral direction of the fixing belt, that is, a section including the second section 401-2 in the thickness-axial directions of the elastic layer was subjected to polishing processing with an ion beam. A cross section polisher (product name: SM-09010, manufactured by JEOL Ltd.) was used in the polishing processing of the sections. The polishing processing was performed as follows: under an argon gas atmosphere, an applied voltage was set to 4.5 V, and the ion beam was applied to each section for 11 hours.

Subsequently, for each of the 5 samples each having the first section subjected to the polishing processing, the first section was observed with a field emission scanning electron microscope (product name: FE-SEM SIGMA 500 VP, manufactured by Carl Zeiss AG), and a sectional image (SEM image) measuring 150 μm long by 100 μm wide was obtained. The observation was performed in a backscattered electron image mode under the conditions of a magnification of 2,000, an acceleration voltage of 8.0 kV, and a working distance of 4 mm. In addition, the resolution of each of the SEM images was set to a resolution sufficient for the analysis of the second fillers in the SEM image, for example, a resolution measuring 768 pixels long by 1,024 pixels wide.

In addition, for each of the 5 samples each having the second section subjected to the polishing processing, the second section was observed with the SEM in the same manner as that described above, and a sectional image (SEM image) measuring 150 μm long by 100 μm wide was obtained.

At the time of the obtainment of the SEM images from the first section and the second section, the following adjustment was performed: the vertical direction of each of the SEM images was parallel to the thickness direction of the elastic layer; and the horizontal direction of the SEM image was parallel to the peripheral direction or axial direction of the elastic layer.

Next, each of the 10 SEM images thus obtained was subjected to binarization processing so that a metal silicon filler portion in the SEM image became white, and a silicone rubber portion therein became black. Thus, a binarized image was obtained. The binarization processing was performed in accordance with Otsu's method described in the above-mentioned literature (IEEE Transactions on SYSTEMS, MAN, AND CYBERNETICS, vol. SMC-9, No. 1, January 1979, pp. 62-66) through use of image processing software (product name: "ImageJ", manufactured by the National Institutes of Health).

The circle-equivalent diameters of the metal silicon fillers of each of the 10 resultant binarized images were calculated, and the image was divided into an image in which only the first fillers each having a circle-equivalent diameter of 5 μm or more were left ("first filler image"), and an image in which only the second fillers each having a circle-equivalent diameter of less than 5 μm were left ("second filler image"). The gross area of the first fillers was determined from the first filler image thus obtained, and the ratio (area ratio) of the gross area to the area (150 μm×100 μm) of the binarized image was determined. Similarly, the gross area of the second fillers was determined from the second filler image, and the ratio of the gross area to the area of the binarized image was determined. Then, the average of the area ratios of the first fillers calculated from the 10 respective binarized images, and the average of the area ratios of the second fillers calculated from the 10 respective binarized images were determined.

Next, the first filler image and the second filler image were subjected to two-dimensional Fourier transformation, and the resultant power spectra were integrated in the thickness direction of the elastic layer to provide elliptical plots representing the directions in, and the degrees to, which the first fillers and the second fillers were arrayed in the elastic layer. In the two-dimensional Fourier transformation, a peak appears in a direction perpendicular to the periodicity of a binarized image, and hence elliptical plots in each of which the result of the two-dimensional Fourier transformation was represented so as to be out of phase by 90° were produced. Accordingly, a 90°-270° direction in each of the resultant elliptical plots represents the thickness direction of the elastic layer, and a 0°-180° direction therein represents the peripheral direction or axial direction of the elastic layer. When, in each of the elliptical plots thus obtained, the length of a semi-major axis "x" was represented by x1, and the length of a semi-minor axis "y" was represented by y1, an array degree "f" serving as the ellipticity of the elliptical plot was determined by using the calculation equation (1). In addition, with regard to the elliptical plot produced from the second filler image, an angle Φ (array angle) formed by the semi-major axis "x" of the elliptical plot with respect to the 0°-180° direction (abscissa axis direction) was determined.

Then, the average fL of the array degrees "f" determined from the elliptical plots produced from the 10 first filler images was determined. In addition, the average fS of the array degrees "f" determined from the elliptical plots produced from the 10 second filler images, and the average ΦS of the array angles Φ determined therefrom were determined.

(3-4) Measurement of Mass Reduction Rate (3-4-1) Production of Sample Sheet

The top of a stainless steel (SUS)-made film having a thickness of 50 μm was coated with the addition-curable liquid silicone rubber composition for forming an elastic layer with a film applicator (manufactured by Allgood) at a rate of 10 mm/sec so that the thickness of the composition became 250 μm. After that, the liquid silicone rubber composition was heated at 160° C. for 1 minute to be primarily cured, and then the silicone rubber composition layer was heated at a temperature of 200° C. for 30 minutes to be secondarily cured. Thus, an elastic layer sample sheet was produced.

(3-4-2) Measurement of Mass Reduction Rate

2 Grams (2 g) of a sample was collected from the above-mentioned elastic layer sample sheet, and was immersed in 50 ml of a normal propyl bromide liquid containing dodecylbenzenesulfuric acid at a concentration of 10 wt % (product name: e-SOLVE 21RS, manufactured by Kaneko Chemical Co., Ltd.) at a temperature of 40° C. Then, the immersed sample was washed for 60 minutes under the application of an ultrasonic wave at 40 kHz. Thus, the cured silicone rubber was dissolved, and the metal silicon fillers were extracted. Next, the resultant metal silicon fillers were subjected to filtration washing under reduced pressure with 10 ml of toluene at a temperature of 25° C. three times through use of a Kiriyama funnel having a diameter of 40 mm and filter paper No. 5C for a Kiriyama funnel (retained particle diameter: 1 μm). The metal silicon fillers thus washed were dried at a temperature of 120° C. for 1 hour. 50 Milligrams of the dried metal silicon fillers were weighed and subjected to TGA measurement. "TGA/DSC 3+" (product name, manufactured by Mettler-Toledo International Inc.) was used as a TGA apparatus, and the temperature of the particles was increased from a temperature of 50° C. to a temperature of 500° C. at 5° C./min in a stream of dry air at 80 ml/min, followed by the measurement of a change in mass thereof at the time. A mass reduction rate (%) in the range of from 300° C. to 500° C. was calculated from the resultant mass change data.

(3-5) Measurement of Thickness of Oxide Film

Dried metal silicon fillers were obtained from the elastic layer sample sheet in the same manner as in the method described in the section (3-4-2). The thickness of an oxide film on the surface of each of the resultant metal oxide fillers was measured by using a FIB-TEM method. The measurement was performed at 5 sites of one metal silicon filler, and the average of the measured values was adopted as the thickness of the oxide film. Pretreatment conditions for the measurement and measurement conditions were set as described below.

Coating: E-1030 manufactured by Hitachi, Ltd. (Pt—Pd film, 15 mA, 60 seconds×twice)

FIB-SEM: Helio 600 manufactured by FEI (μ-sampling, FIB: 30 kVGa+)

TEM: Tecnai F30 manufactured by FEI (300 kV)

(4) Actual Machine Evaluation (Fixability, Durability, and Peeling Discharge Mark)

<Fixability Evaluation>

The fixing belt was incorporated into the heat fixing device of an electrophotographic copying machine (product name: imagePRESS C850, manufactured by Canon Inc.). Then, the heat fixing device was mounted on the copying machine. A cyan solid image was formed on thick paper having a basis weight of 300 g/m$^2$ (product name: UPM Finesse gloss 300 g/m$^2$, manufactured by UPM) with the copying machine while the fixation temperature of the heat fixing device was set to be lower than a standard fixation temperature.

Specifically, 5 cyan solid images were continuously formed while the fixation temperature of the heat fixing device was adjusted from 195° C. serving as a standard fixation temperature in the copying machine to 175° C., and the image density of the fifth solid image was measured. Next, the toner surface of the solid image was rubbed with lens-cleaning paper having applied thereto a load of 4.9 kPa (50 g/cm$^2$) in the same direction three times, and its image density after the rubbing was measured. Then, when the percentage by which the image density after the rubbing reduced as compared to that before the rubbing (=[difference between image densities before and after rubbing]/[image density before rubbing]×100) was less than 5%, it was judged that the toner fixed to the thick paper. The result was evaluated by the following criteria. The image densities were measured with a reflection densitometer (manufactured by Macbeth).

A: The toner fixed to the thick paper at a fixation temperature of 175° C. or more and less than 180° C.

B: The toner fixed to the thick paper at a fixation temperature of 180° C. or more and less than 190° C.

C: The toner fixed to the thick paper at a fixation temperature of 190° C. or more and less than 195° C.

<Durability Evaluation>

Under a state in which the fixation temperature of the fixing belt was set to a standard fixation temperature (195° C.), a cyan solid image was continuously formed on A4 size plain paper, and the number of sheets at the time point when the breakage or plastic deformation of the elastic layer of the fixing belt occurred was recorded, and was evaluated by the following criteria. In the case where the breakage or plastic deformation of the elastic layer of the fixing belt did not occur even when the number of the images reached 740,000, the image formation was stopped on the 740,000th sheet.

A: The breakage or plastic deformation of the elastic layer of the fixing belt was not observed even by the formation of the image on 740,000 sheets.

B: The breakage or plastic deformation of the elastic layer of the fixing belt was not caused even by the formation of the image on 600,000 sheets, but the breakage or plastic deformation of the elastic layer of the fixing belt was caused by the formation of the image on 740,000 sheets.

C: The breakage or plastic deformation of the elastic layer of the fixing belt was caused by the formation of the image on less than 600,000 sheets.

<Image Evaluation>

The fixing belt obtained in the above-mentioned section (2) was incorporated into the heat fixing device of an electrophotographic copying machine (product name: imagePRESS C850, manufactured by Canon Inc.) in the same manner as in the fixability evaluation. Then, the heat fixing device was mounted on the copying machine. A cyan solid image was formed on thick paper having a basis weight of 300 g/m$^2$ (product name: UPM Finesse gloss 300 g/m$^2$, manufactured by UPM) with the copying machine while the fixation temperature of the heat fixing device was set to a standard fixation temperature. The fifth solid image formed through the paper passing was visually observed, and the presence or absence of gloss unevenness, and its degree were evaluated by the following criteria.

A: The solid image was free of any gloss unevenness, and was extremely excellent in image quality.

B: The solid image was free of any gloss unevenness, and was excellent in image quality.

C: The solid image had some degree of gloss unevenness.

<Peeling Discharge Mark Evaluation>

Under a state in which the fixation temperature of the fixing belt was set to a standard fixation temperature (195° C.), the speed thereof was adjusted to 246 mm/sec.

A4 horizontal size cut paper (state in which the long side of the paper was positioned so as to be perpendicular to a paper-conveying direction Q) having a basis weight of 209 g/m$^2$ and LTR horizontal size cut paper having a basis weight of 220 g/m$^2$ were each used as paper.

A test environment had a room temperature of 23° C. and a humidity of 15%. After an image forming apparatus and the paper had been sufficiently left to stand in the low-humidity environment, first, 100 sheets of the A4 paper were continuously passed (the potential of the paper passing region of a fixing film was set to a constant value). After that, a halftone image was continuously formed on 5 sheets of the LTR paper. The presence or absence of an image failure, such as a stripe or gloss unevenness, on the fifth image was visually observed, and was evaluated by the following criteria.

A: An image failure did not occur on any sheet during the formation on the 5 sheets.

B: An image failure due to a peeling discharge mark was slightly observed during the formation on the 5 sheets, but was at a level causing no practical problem.

C: An image failure occurred on a certain sheet during the formation on the 5 sheets.

Examples 2 and 3

In Example 1, the blending amounts of the first fillers and the second fillers were changed so that the average of the area ratios of the first fillers and the average of the area ratios of the second fillers became values shown in Table 1. Addition-curable liquid silicone rubber compositions were prepared in the same manner as in Example 1 except the foregoing. In addition, the liquid silicone rubber compositions were used, and the electric field application time was changed to 20 seconds. Fixing belts were produced in the same manner as in Example 1 except the foregoing, and were evaluated.

Examples 4 to 6

In Example 1, the blending amounts of the first fillers and the second fillers were changed so that the average of the area ratios of the first fillers and the average of the area ratios of the second fillers became values shown in Table 1. Addition-curable liquid silicone rubber compositions were prepared in the same manner as in Example 1 except the foregoing. In addition, fixing belts were produced in the same manner as in Example 1 except that the liquid silicone rubber compositions were used and the electric field application time was changed to 300 seconds, and the belts were evaluated.

Example 7

In Example 1, the blending amounts of the first fillers and the second fillers were changed so that the average of the area ratios of the first fillers and the average of the area ratios of the second fillers became values shown in Table 1. An addition-curable liquid silicone rubber composition was prepared in the same manner as in Example 1 except the foregoing. In addition, a fixing belt was produced in the same manner as in Example 1 except that the liquid silicone rubber composition was used, and the electric field application time was changed to 200 seconds, and the belt was evaluated.

Example 8

A fixing belt was produced in the same manner as in Example 1 except that the electric field application time was changed to 60 seconds, and the belt was evaluated.

Example 9

A mixture 9-1 was obtained by stirring and mixing the materials of the mixture 1-1 at 10 rpm for 160 minutes through use of a planetary mixer (product name: HIVIS MIX Model 2P-01, manufactured by PRIMIX Corporation) instead of the rotation-revolution mixer used in the preparation of the mixture 1-1 in Example 1. The resultant mixture 9-1 was stored to stand still at normal temperature for 5 days. An addition-curable liquid silicone rubber composition was prepared in the same manner as in Example 1 except that the mixture 9-1 after the still standing storage was used instead of the mixture 1-1. In addition, a fixing belt was produced in the same manner as in Example 1 except that the liquid silicone rubber composition was used, and the belt was evaluated.

Example 10

Large-diameter metal silicon (product name: #350, manufactured by Kinsei Matec Co., Ltd., volume-average particle diameter: 10 μm) and small-diameter metal silicon (product name: FINE, manufactured by Kinsei Matec Co., Ltd., volume-average particle diameter: 3 μm) were loaded into a hybridizer (product name: HYBRIDIZATION SYSTEM HMS-1-2L, manufactured by Nara Machinery Co., Ltd.), and were treated at a number of revolutions of 6,600 $min^{-1}$ for a treatment time of 10 minutes so that an oxide film having a thickness of 5 nm was formed on the surface of each of the materials. A mixture 10-1 was prepared in the same manner as in the mixture 1-1 in Example 1 except that the large-diameter metal silicon and the small-diameter metal silicon each having the oxide film thus formed on its surface were used. The resultant mixture 10-1 was stored to stand still under normal temperature for 6 days. A liquid silicone rubber composition was prepared in the same manner as in Example 1 except that the mixture 10-1 after the still standing storage was used. The mixture 10-1 was used in the preparation of the liquid silicone rubber composition without being stored to stand still for 1 day or more. In addition, a fixing belt was produced in the same manner as in Example 1 except that the resultant liquid silicone rubber composition was used, and the belt was evaluated.

Example 11

The treatment time for the large-diameter metal silicon and the small-diameter metal silicon was set to 5 minutes, and the thickness of the oxide film on the surface of each of the materials was set to 3 nm. A liquid silicone rubber composition was prepared in the same manner as in Example 10 except that the resultant large-diameter metal silicon and small-diameter metal silicon were used. In addition, a fixing belt was produced in the same manner as in Example 10 except that the resultant liquid silicone rubber composition was used, and the belt was evaluated.

Example 12

The treatment time for the large-diameter metal silicon and the small-diameter metal silicon was set to 20 minutes, and the thickness of the oxide film on the surface of each of the materials was set to 20 nm. A liquid silicone rubber composition was prepared in the same manner as in Example 10 except that the resultant large-diameter metal silicon and small-diameter metal silicon were used. In addition, a fixing belt was produced in the same manner as in Example 10 except that the resultant liquid silicone rubber composition was used, and the belt was evaluated.

Comparative Example 1

In Example 1, the blending amounts of the first fillers and the second fillers were changed so that the average of the area ratios of the first fillers and the average of the area ratios of the second fillers became values shown in Table 1. An addition-curable liquid silicone rubber composition was prepared in the same manner as in Example 1 except the foregoing. In addition, a fixing belt was produced in the same manner as in Example 1 except that the resultant liquid silicone rubber composition was used, and the belt was evaluated.

Comparative Example 2

A liquid silicone rubber composition was prepared in the same manner as in Example 1 except that the time period for which the mixture 1-1 was stored to stand still was set to 6 days. In addition, a fixing belt was produced in the same manner as in Example 1 except that the resultant liquid silicone rubber composition was used, and the belt was evaluated.

Comparative Example 3

A fixing belt was produced in the same manner as in Example 1 except that the electric field orientation treatment was not performed, and the belt was evaluated.

Comparative Example 4

The treatment time for the large-diameter metal silicon and the small-diameter metal silicon was set to 30 minutes, the number of revolutions was set to 8,300 $min^{-1}$, and the thickness of the oxide film on the surface of each of the materials was set to 23 nm. A liquid silicone rubber composition was prepared in the same manner as in Example 10 except that the resultant large-diameter metal silicon and small-diameter metal silicon were used. In addition, a fixing belt was produced in the same manner as in Example 10 except that the resultant liquid silicone rubber composition was used, and the belt was evaluated.

Comparative Example 5

In Example 1, the blending amounts of the first fillers and the second fillers were changed so that the average of the area ratios of the first fillers and the average of the area ratios of the second fillers became values shown in Table 1. An addition-curable liquid silicone rubber composition was prepared in the same manner as in Example 1 except the foregoing. In addition, a fixing belt was produced in the same manner as in Example 1 except that the liquid silicone rubber composition was used, and the belt was evaluated.

The foregoing results are shown in Table 1 and Table 2.

TABLE 1

| | Electric field application | Filler state: Average area ratio of first fillers % | Filler state: Average area ratio of second fillers % | Filler state: Total % | Filler state: Average array degree of first fillers fL | Filler state: Average array degree of second fillers fS | Filler state: Average array angle ΦS (°) | Filler state: TGA loss ratio % | Thickness of oxide film nm | Mixing method | Still standing time | Physical properties of elastic layer: Thermal conductivity λ W/(m · K) | Physical properties of elastic layer: Volume resistivity ρv LOGΩ · cm | Evaluation rank: Fixability | Evaluation rank: Durability | Evaluation rank: Image | Evaluation rank: Peeling discharge mark |
|---|---|---|---|---|---|---|---|---|---|---|---|---|---|---|---|---|---|
| Example 1 | 100 seconds | 30 | 10 | 40 | 0.11 | 0.35 | 75 | 0.05 | 1 | Rotation-revolution mixer | 40 days | 1.50 | 10.2 | A | A | A | A |
| Example 2 | 20 seconds | 33 | 7 | 40 | 0.10 | 0.19 | 59 | 0.06 | 1 | Rotation-revolution mixer | 40 days | 1.32 | 9.0 | B | A | B | B |
| Example 3 | 20 seconds | 21 | 21 | 42 | 0.10 | 0.19 | 58 | 0.05 | 1 | Rotation-revolution mixer | 40 days | 1.31 | 10.5 | B | B | B | A |
| Example 4 | 300 seconds | 32 | 8 | 40 | 0.16 | 0.51 | 87 | 0.05 | 1 | Rotation-revolution mixer | 40 days | 1.45 | 9.1 | B | A | B | B |
| Example 5 | 300 seconds | 21 | 19 | 40 | 0.16 | 0.51 | 103 | 0.06 | 1 | Rotation-revolution mixer | 40 days | 1.36 | 9.7 | B | A | A | A |
| Example 6 | 300 seconds | 22 | 20 | 42 | 0.17 | 0.51 | 85 | 0.05 | 1 | Rotation-revolution mixer | 40 days | 1.51 | 10.4 | A | A | A | A |
| Example 7 | 200 seconds | 32 | 10 | 42 | 0.10 | 0.50 | 82 | 0.05 | 1 | Rotation-revolution mixer | 40 days | 1.58 | 9.9 | A | A | A | B |
| Example 8 | 60 seconds | 30 | 10 | 40 | 0.11 | 0.20 | 98 | 0.10 | 1 | Rotation-revolution mixer | 40 days | 1.52 | 10.0 | A | A | A | A |
| Example 9 | 100 seconds | 30 | 10 | 40 | 0.11 | 0.31 | 98 | 0.10 | 1 | Planetary mixer | 5 days | 1.60 | 10.0 | A | A | A | A |
| Example 10 | 100 seconds | 30 | 10 | 40 | 0.10 | 0.36 | 72 | 0.03 | 5 | Rotation-revolution mixer | 6 days | 1.50 | 10.7 | A | A | A | A |
| Example 11 | 100 seconds | 30 | 10 | 40 | 0.10 | 0.34 | 70 | 0.03 | 3 | Rotation-revolution mixer | 6 days | 1.50 | 10.5 | A | A | A | A |
| Example 12 | 100 seconds | 30 | 10 | 40 | 0.10 | 0.34 | 71 | 0.03 | 20 | Rotation-revolution mixer | 6 days | 1.30 | 10.9 | B | A | A | A |

TABLE 2

| | Electric field application | Filler state: Average area ratio of first fillers % | Average area ratio of second fillers % | Total % | Average array degree of first fillers fL | Average array degree of second fillers fS | Average array angle ΦS (°) | TGA loss ratio % | Thickness of oxide film nm |
|---|---|---|---|---|---|---|---|---|---|
| Comparative Example 1 | 100 seconds | 33 | 10 | 43 | 0.10 | 0.32 | 66 | 0.07 | 1 |
| Comparative Example 2 | 100 seconds | 30 | 10 | 40 | 0.10 | 0.30 | 70 | 0.03 | 1 |
| Comparative Example 3 | None | 30 | 10 | 40 | 0.10 | 0.12 | 31 | 0.06 | 1 |
| Comparative Example 4 | 100 seconds | 30 | 10 | 40 | 0.10 | 0.36 | 70 | 0.03 | 23 |
| Comparative Example 5 | 100 seconds | 10 | 30 | 40 | 0.12 | 0.19 | 55 | 0.06 | 1 |

| | Mixing method | Still standing time | Physical properties of elastic layer: Thermal conductivity λ W/(m · K) | Volume resistivity ρv LOGΩ · cm | Evaluation rank: Fixability | Durability | Image | Peeling discharge mark |
|---|---|---|---|---|---|---|---|---|
| Comparative Example 1 | Rotation-revolution mixer | 40 days | 1.70 | 9.0 | A | C | C | B |
| Comparative Example 2 | Rotation-revolution mixer | 6 days | 1.50 | 7.0 | A | A | A | C |
| Comparative Example 3 | Rotation-revolution mixer | 40 days | 0.98 | 11.5 | C | A | A | A |
| Comparative Example 4 | Rotation-revolution mixer | 6 days | 1.20 | 11.0 | C | A | A | A |
| Comparative Example 5 | Rotation-revolution mixer | 40 days | 1.02 | 12.0 | C | A | A | A |

In each of Examples 1 to 9, despite the fact that the thermal conductivity of the elastic layer was as high as 1.30 W/(m·K) or more, the volume resistivity ρv thereof was 9.0 LOG Ω·cm or more. This is probably because of the following reasons: the second fillers were arrayed in the thickness direction of the elastic layer; and the metal silicon fillers had a large amount of a bound rubber on their surfaces.

In addition, in each of Examples 6 to 9, the following results were obtained. The average of the area ratios of the second fillers each having a circle-equivalent diameter of less than 5 μm is 10% or more and 20% or less. In addition, the average of the area ratios of the first fillers each having a circle-equivalent diameter of 5 μm or more is 22% or more and 32% or less. In addition, the thermal conductivity is as high as 1.50 W/(m·K) or more. Because of the foregoing, in each of Examples 6 to 9, particularly satisfactory fixability was recognized. Further, in each of Examples 7 to 9, the average array degree fL is adjusted to 0.15 or less, the average array degree fS is adjusted to 0.20 or more and 0.50 or less, and the average array angle ΦS is adjusted to 60° or more and 120° or less. Accordingly, an image property was satisfactory while high thermal conductivity was maintained.

With regard to each of Examples 10 to 12, the metal silicon fillers had, on their surfaces, oxide films each having a thickness of from 3 nm to 20 nm. It is conceivable from the foregoing that a heat transfer path formed by the array of the second fillers in the thickness direction of the elastic layer did not sufficiently function as a conductive path. As a result, in each of the elastic layers according to Examples 10 to 12, the thermal conductivity in the thickness direction was high, but a reduction in volume resistivity was suppressed. Because of the foregoing, the result of the fixability evaluation was Rank A, and the result of the peeling discharge mark evaluation was Rank B.

With regard to Comparative Example 1, the content of the metal silicon fillers in the elastic layer was large (the sum of the average area ratios of the first fillers and the second fillers was 43%). Accordingly, the thermal conductivity of the elastic layer in the thickness direction was high. The volume resistivity of the elastic layer was kept high because a large amount of a bound rubber was present on the surfaces of the metal silicon fillers. However, the result of the evaluation of the durability of the fixing belt was Rank C because the content of the metal silicon fillers was large.

With regard to Comparative Example 2, the second fillers were arrayed in the thickness direction of the elastic layer to a high degree. Accordingly, the thermal conductivity of the elastic layer in the thickness direction was high (λ=1.50 W/(m·K)). However, a bound rubber was not sufficiently present on the surfaces of the metal silicon fillers, and hence a heat transfer path formed by the metal silicon fillers in the elastic layer also functioned as a conductive path to reduce the volume resistivity of the elastic layer (ρv=7.0 Log Ω·cm). Because of the foregoing, the result of the peeling discharge mark evaluation was Rank C.

With regard to Comparative Example 3, no electric field was applied in the step of forming the elastic layer. Accordingly, the second fillers were not arrayed in the thickness direction of the elastic layer (fS=0.12). As a result, the thermal conductivity of the elastic layer in the thickness direction was low (λ=0.98 W/(m·K)), and hence the result of the fixability evaluation was Rank C.

With regard to Comparative Example 4, the second fillers were arrayed in the thickness direction of the elastic layer, but the thermal conductivity of the elastic layer in the thickness direction was low (λ=1.20 W/(m·K)). As a result, the result of the fixability evaluation was Rank C. Such result is probably due to the fact that the metal silicon fillers in the elastic layer had, on their surfaces, the oxide films each having a thickness of 23 nm, and hence heat transfer between the metal silicon fillers was inhibited by the thick oxide films.

In Comparative Example 5, to set the average area ratio of the second fillers to 30%, the blending amount of the second fillers in the liquid silicone rubber composition for forming an elastic layer was increased. The increase rose the viscosity of the liquid silicone rubber composition. Probably because of the foregoing, even when the electric field was applied to the layer of the liquid silicone rubber composition after the formation of the layer, the second fillers hardly moved in the layer. Probably as a result of the foregoing, the array of the second fillers in the thickness direction of the elastic layer became insufficient (ΦS=55°). In addition, because of the foregoing, the thermal conductivity of the elastic layer of the fixing belt according to Comparative Example 5 in the thickness direction had a value as low as 1.02 W/(m·K), and as a result, the result of the fixability evaluation was Rank C.

In Examples and Comparative Examples above, the fixing belts have been described, but it can be easily understood that a similar tendency is observed in the case of a heating roller.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-068808, filed Apr. 19, 2022, and Japanese Patent Application No. 2023-062779, filed Apr. 7, 2023, which are hereby incorporated by reference herein in their entirety.

What is claimed is:

1. An electrophotographic member having an endless shape comprising:
- a substrate; and
- an elastic layer on an outer peripheral surface of the substrate,
- the elastic layer containing a silicone rubber and metal silicon fillers dispersed in the silicone rubber, wherein
- an average of area ratios of the metal silicon fillers in respective first binarized images each having a size measuring 150 μm by 100 μm at 5 arbitrary sites of a first section in thickness-peripheral directions of the elastic layer is 42% or less, and
- an average of area ratios of the metal silicon fillers in respective second binarized images each having a size measuring 150 μm by 100 μm at 5 arbitrary sites of a second section in thickness-axial directions of the elastic layer is 42% or less, and wherein
- the elastic layer has λ of 1.30 W/(m·K) or more, where λ is a thermal conductivity of the elastic layer in a thickness direction thereof, and
- the elastic layer has ρv of 9.0 LOG Ω·cm or more, where ρv is a common logarithm value of a volume resistivity thereof.

2. The electrophotographic member according to claim 1, wherein the metal silicon fillers include
- first fillers each having a circle-equivalent diameter of 5 μm or more, and
- second fillers each having a circle-equivalent diameter of less than 5 μm, and wherein
- an average of area ratios of the first fillers in the respective first binarized images and the respective second binarized images is from 21% to 33%, and
- an average of area ratios of the second fillers in the respective first binarized images and the respective second binarized images is from 7% to 21%.

3. The electrophotographic member according to claim 1, wherein the metal silicon fillers include
- first fillers each having a circle-equivalent diameter of 5 μm or more, and
- second fillers each having a circle-equivalent diameter of less than 5 μm, and wherein
- an average of area ratios of the first fillers in the respective first binarized images and the respective second binarized images is from 22% to 32%, and
- an average of area ratios of the second fillers in the respective first binarized images and the respective second binarized images is from 10% to 20%.

4. The electrophotographic member according to claim 2, wherein
- the first fillers have an average array degree fL of 0.00 to 0.17 in the thickness direction of the elastic layer,
- the second fillers have an average array degree fS of 0.19 to 0.51 in the thickness direction of the elastic layer, and
- wherein the second fillers have an average array angle ΦS of 59° to 120° in the thickness direction of the elastic layer.

5. The electrophotographic member according to claim 1, wherein
- the first fillers have an average array degree fL of 0.00 to 0.15 in the thickness direction of the elastic layer,
- the second fillers have an average array degree fS of 0.20 to 0.50 in the thickness direction of the elastic layer, and
- wherein the second fillers have an average array angle ΦS of 60° to 120° in the thickness direction of the elastic layer.

6. The electrophotographic member according to claim 1, wherein the metallic silicon fillers have a mass reduction rate of 0.05% or more, the mass reduction rate being determined by:
- (i) collecting 2 g of a sample from the elastic layer;
- (ii) immersing the sample into 50 ml of a normal propyl bromide liquid containing dodecylbenzene sulfuric acid at a concentration of 10 wt % and having a temperature of 40° C., and applying an ultrasonic wave of 40 kHz for 60 minutes to solve the silicone rubber of the sample;

(iii) extracting the metallic silicon particles, and then subjecting the metallic silicon particles extracted to vacuum filtration washing three times with 10 ml of toluene at a temperature of 25° C.; and (iv) subjecting the metallic silicon particles resulting from the step (iii) to a thermogravimetric analysis and measuring the mass reduction rate in temperature range of from 300° C. to 500° C.

7. The electrophotographic member according to claim 1, wherein the metal silicon fillers include metal silicon fillers having, on surfaces thereof, silicon oxide films each having a thickness of 3 nm to 20 nm.

8. The electrophotographic member according to claim 1, wherein the electrophotographic member is a fixing member for a heat fixing device.

9. A heat fixing device comprising:

a heating member; and a pressurizing member arranged to face the heating member, the heating member being an electrophotographic member, wherein the electrophotographic member has an endless shape, and includes a substrate and an elastic layer on an outer peripheral surface of the substrate, wherein the elastic layer contains a silicone rubber and metal silicon fillers dispersed in the silicone rubber, an average of area ratios of the fillers in respective first binarized images each having a size measuring 150 μm by 100 μm at 5 arbitrary sites of a first section in thickness-peripheral directions of the elastic layer, and an average of area ratios of the fillers in respective second binarized images each having a size measuring 150 μm by 100 μm at 5 arbitrary sites of a second section in thickness-axial directions of the elastic layer is 42% or less, and wherein the elastic layer has λ of 1.30 W/(m·K) or more, where λ is a thermal conductivity of the elastic layer in a thickness direction thereof, and the elastic layer has ρv of 9.0 LOG Ω·cm or more, where ρv is a common logarithm value of a volume resistivity thereof.

10. The heat fixing device according to claim 9, further comprising a heating unit configured to heat the substrate of the electrophotographic member.

11. The heat fixing device according to claim 10, wherein the heating unit is an induction heating unit.

12. The heat fixing device according to claim 9, wherein the heating unit is a heater configured to heat the substrate.

13. The heat fixing device according to claim 12, wherein the heater is arranged in contact with an inner peripheral surface of the substrate.

* * * * *